United States Patent
Ando

(10) Patent No.: US 6,744,720 B2
(45) Date of Patent: Jun. 1, 2004

(54) OPTICAL ELEMENT AND OPTICAL PICK-UP

(75) Inventor: Nobuhiko Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 09/760,636

(22) Filed: Jan. 16, 2001

(65) Prior Publication Data

US 2001/0048553 A1 Dec. 6, 2001

(30) Foreign Application Priority Data

Jan. 21, 2000 (JP) .................................. 2000-017740

(51) Int. Cl.[7] .......................... G11B 7/00; G11B 7/135
(52) U.S. Cl. ............................. 369/112.21; 369/112.28
(58) Field of Search ................................ 369/112, 106, 369/112.21, 112.28; 359/837

(56) References Cited

U.S. PATENT DOCUMENTS

| | | | | |
|---|---|---|---|---|
| 4,429,378 A | * | 1/1984 | Sato | 369/112.21 |
| 5,017,768 A | * | 5/1991 | Takagi | 369/44.41 |
| 5,070,493 A | * | 12/1991 | Marshall et al. | 369/112.21 |
| 5,307,335 A | * | 4/1994 | Komiya | 369/112.19 |
| 5,617,398 A | * | 4/1997 | Lee et al. | 369/112.28 |
| 6,317,400 B1 | * | 11/2001 | Yanagawa et al. | 369/112.19 |
| 6,567,366 B2 | * | 5/2003 | Kim et al. | 369/112.28 |

\* cited by examiner

*Primary Examiner*—Doris H. To
*Assistant Examiner*—Jorge L Ortiz Criado
(74) *Attorney, Agent, or Firm*—Oblon, Spivak, McClelland, Maier & Neustadt, P.C.

(57) ABSTRACT

An optical pick-up able to reduce a change of an optical axis of a light beam emitted to a photodetector when the optical element is tilted. An optical element in the optical pick-up is struck with an incident light beam from a first surface of a first prism, reflects the light beam refracted at the first surface at the second surface 161b, refracts the reflected light beam at the joined surfaces of the first prism and the second prism, and further refracts the refracted light beam at the first surface of the second prism to form an emitted light beam. The direction of the incident light beam and the direction of the emitted light beam perpendicularly intersect in the same plane. The optical element is struck with the light beam from the direction of the light beam emitted from the first surface of the second prism, reflects the light beam refracted at the first surface at the film, refracts the reflected light beam at a third surface, and emits it in a direction opposite to the direction of the incident light beam to the photodetector.

38 Claims, 17 Drawing Sheets

FIG. 9A

| WAVELENGTH (nm) | n1 | n2 | α1 | α2 | θ1 | θ1' | θ2 | θ2' | θ3 | θ3' | β |
|---|---|---|---|---|---|---|---|---|---|---|---|
| 395 | 1.53153 | 1.59307 | 79.08 | 41.21 | 65.619 | 36.492 | -42.587 | -40.585 | 0.628 | 1.00 | 2.009 |
| 405 | 1.53020 | 1.59059 | 79.08 | 41.21 | 65.619 | 36.529 | -42.550 | -40.584 | 0.629 | 1.00 | 2.007 |
| 415 | 1.52897 | 1.58832 | 79.08 | 41.21 | 65.619 | 36.563 | -42.516 | -40.583 | 0.630 | 1.00 | 2.005 |

FIG. 9B

| α1 | δ | α11 | α12 |
|---|---|---|---|
| 79.08 | 63.25 | 71.84 | 115.41 |

OPTICAL ELEMENT AND OPTICAL PICK-UP

BACKGROUND OF THE INVENTION

1. Field of the Invention

The present invention relates to an optical element comprising a plurality of prisms which differ in their refractive indices and to an optical pick-up including the optical element.

2. Description of the Related Art

FIG. 1 is a schematic view of an example of an optical pick-up of the related art.

This optical pick-up 56 comprises a semiconductor laser 4, a collimator lens 5, a beam shaping prism (anamorphic prism) 9, a beam splitter 3, an objective lens 2, and a not shown photodetector.

The semiconductor laser 4 emits a linearly polarized laser beam to the collimator lens 5.

The collimator lens 5 collimates the laser beam from the semiconductor laser 4 to make it a parallel beam directing to the beam shaping prism 9.

The beam shaping prism 9 shapes the laser beam from the collimator lens 5 and emits it to the beam splitter 3.

The beam splitter 3 passes the laser beam from the beam shaping prism 9 and emits it to the objective lens 2.

The objective lens 2 converges the laser beam from the beam splitter 3 and emits it to an optical disk 80 to form a beam spot on the recording surface of the optical disk 80. In addition, the objective lens 2 returns the laser beam reflected from the optical disk 80 (reflected laser beam) to the beam splitter 3.

The beam splitter 3 is struck by the laser beam from the objective lens 2, reflects the incident laser beam by an inner reflecting mirror, and emits it to the photodetector.

The photodetector receives the laser beam from the beam splitter 3 at a receiving unit and generates an output signal.

The output laser beam of the semiconductor laser 4 has a spread angle in the vertical direction different from that in the horizontal direction, so the sectional shape of the output laser beam is elliptical or near elliptical.

The beam shaping prism 9 changes the sectional shape of the laser beam from the semiconductor laser 4 from an ellipse to a circle to make the diameter of the beam in the long axis direction and short axis direction equal or substantially equal. In this way, the beam shaping prism 9 outputs the incident light beam spread in one direction.

FIG. 2 is a schmatic view of the configuration of another example of an optical pick-up of the related art.

This optical pick-up 57 comprises a semiconductor laser 4, a collimator lens 5, a beam shaping prism 39, an objective lens 2, and a not shown photodetector.

The semiconductor laser 4 emits a linearly polarized laser beam to the collimator lens 5.

The collimator lens 5 collimates the laser beam from the semiconductor laser 4 to make it a parallel beam directing to the beam shaping prism 39.

The beam shaping prism 39 shapes the laser beam from the collimator lens 5 and emits it to the objective lens 2.

The objective lens 2 converges the laser beam from the beam shaping prism 39 and directs it to an optical disk 80 to form a beam spot on the recording surface of the optical disk 80. In addition, the objective lens 2 returns the laser beam reflected at the optical disk 80 (reflected laser beam) to the beam shaping prism 39.

The beam shaping prism 39 is struck by the laser beam from the objective lens 2, reflects the incident laser beam, and emits it to the photodetector.

The photodetector receives the laser beam from the beam shaping prism 39 at the receiving unit and generates an output signal.

The output laser beam of the semiconductor laser 4 has a spread angle in the vertical direction different from that in the horizontal direction, so the sectional shape of the output laser beam is elliptical or near elliptical.

The beam shaping prism 39 changes the sectional shape of the laser beam output from the semiconductor laser 4 from an ellipse to a circle to make the diameter of the beam in the long axis direction and short axis direction equal or substantially equal. In this way, the beam shaping prism 39 outputs the incident light beam spread in one direction.

Further, the beam shaping prism 39 also has the function of a beam splitter which reflects the laser beam from the objective lens 2 and directs it to the photodetector.

Note that Japanese Unexamined Patent publication (Kokai) No. 9-80212 discloses an invention of a beam shaping prism and an optical head using the same.

This publication discloses to make the direction of the incident light beam approximately perpendicular to the direction of the emitted light beam by a beam shaping prism having a first prism and a second prism.

In addition, it discloses an optical head which changes the direction of the laser beam from a semiconductor laser (incident laser beam) using the beam shaping prism, sends this laser beam to an optical disk, reflects the laser beam reflected by the optical disk in a direction the same as the incident laser beam by a polarization film, and emits it to a photodetector.

The optical pick-up 56 of FIG. 1 includes a beam splitter 3 and a beam shaping prism 9, so the number of parts rises. This is liable to undesirably lead to higher cost, a larger size, and more complicated production process.

In addition, there is the disadvantage that if the beam shaping prism and/or the beam splitter is tilted, this inclination of the beam shaping prism and/or the beam splitter results in a large change of the optical axis of the laser beam emitted to the photodetector.

Compared with the optical pick-up 56 in FIG. 1, the optical pick-up 57 in FIG. 2 has a beam shaping prism 39 comprising an integrally formed beam splitter 3 and beam shaping prism 9, so it is capable of reducing the number of parts.

There is also the disadvantage that when the beam shaping prism is tilted, the change of the optical axis of the laser beam emitted to the photodetector becomes even larger than the inclination of the beam shaping prism.

SUMMARY OF THE INVENTION

A first object of the present invention is to provide an optical pick-up able to reduce the change of the optical axis of the light beam emitted to a photodetector when the beam shaping prism is tilted. A second object is to provide an optical element able to be used in the above optical pick-up.

The first optical element according to the present invention comprises a first prism having a first refractive index and including a first incidence surface and a first emission surface forming a first angle with the first incidence surface and a first reflection surface facing the first incidence surface and forming a second angle with the first emission surface, a second prism having a second refractive index and including a second incidence surface in contact with the first emission surface and a second emission surface facing the second incidence surface, a third prism having the second refractive index and including a third incidence surface in contact with the second emission surface and a first incidence-emission surface forming a fourth angle with the third incidence surface and a third emission surface forming a fifth angle with the third incidence surface, a film between the second emission surface and the third incidence surface and cooperating with the second emission surface and the third incidence surface to emit the light beam striking the third incidence surface from the second emission surface as a first emitted light beam through the first incidence-emission surface, and to emit a second incident light beam striking the third incidence surface from the first incidence-emission surface as a second emitted light beam through the third emission surface. The first prism shapes the incident light beam with a wavelength striking the first incidence surface at an incident angle, and makes the light beam reflected at the first reflection surface parallel to the optical axis of the second prism and strike the second incidence surface, the first emission surface and the second incidence surface are defined so as to cancel the change of an optical axis caused by the change of the wavelength of the incident light beam.

In the present optical element, preferably, the first incident light beam and the first emitted light beam are in the same plane.

Preferably, the plane defined by the direction of the first incident light beam and the direction of the first emitted light beam substantially perpendicularly intersects the first incidence surface, the first reflection surface, and the first emission surface of the first prism, the second incidence surface and the second emission surface of the second prism, and the third incidence surface, the first incidence-emission surface, and the third emission surface of the third prism.

In the present optical element, the incidence angle, the first and second refractive indexes, the first angle formed by the first incidence surface and the first emission surface, the second angle formed by the first reflection surface and the first emission surface, the fourth angle formed by the third incidence surface and the first emission surface are defined so that the direction of the first incident light beam is substantially opposite and parallel to the direction of the second emitted light beam, and the direction of the first incident light beam is substantially perpendicular with the direction of the first emitted light beam.

In the present optical element, preferably, the beam magnification in the plane defined by the direction of the incident light beam and the direction of the emitted light beam is approximately 1.5 to approximately 2.2. The second prism may comprise a triangular prism of which the second incidence surface directly intersects with the second emission surface, or may comprise a quadrilateral prism of which the second incidence surface and the emission surface are apart from each other.

The film may comprise a translucent film or a polarization film.

A second optical element according to the present invention comprises a first prism having a first refractive index and including a first incidence surface and a first emission surface forming a first angle with the first incidence surface and a first reflection surface forming a second angle with the first incidence surface, a second prism having a second refractive index and including a second incidence surface in contact with the first emission surface and a second emission surface forming a fourth angle with the second incidence surface, a film between the first emission surface and the second incidence surface and cooperating with the first emission surface and the second incidence surface to emit the light beam striking the second incidence surface from the first emission surface as a first emitted light beam through the first incidence-emission surface, and to emit a second incident light beam striking the second incidence surface from the first incidence-emission surface as a second emitted light beam through the second emission surface. The first prism shapes the incident light beam with a wavelength striking the first incidence surface at an incident angle, and makes the light beam reflected at the first reflection surface parallel to the optical axis of the second prism and strike the second incidence surface, the first emission surface and the second incidence surface are defined so as to cancel the change of an optical axis caused by the change of the wavelength of the incident light beam.

In the present optical element, preferably, the first incident light beam and the first emitted light beam are in the same plane.

Preferably, the plane defined by the direction of the first incident light beam and the direction of the first emitted light beam substantially perpendicularly intersects the first incidence surface, the first reflection surface, and the first emission surface of the first prism, and the second incidence surface, the first incidence-emission surface, and the second emission surface of the second prism.

In the present optical element, the incidence angle of the first incident light beam, the first and second refractive indexes, the first angle formed by the first incidence surface and the first emission surface, the second angle formed by the first reflection surface and the first incidence surface, the third angle formed by the second incidence surface and the second emission surface, and the fourth angle formed by the second incidence surface and the first incidence-emission surface are defined so that the direction of the first incident light beam is substantially opposite and parallel to the direction of the second emitted light beam, and the direction of the first incident light beam is substantially perpendicular with the direction of the first emitted light beam.

Preferably, the beam magnification in the plane defined by the direction of the incident light beam and the direction of the emitted light beam is approximately 1.5 to approximately 2.2.

The film may comprise a translucent film or a polarization film.

A third optical element according to the present invention comprises a first prism having a first refractive index and including a first incidence surface and a first emission surface forming a first angle with the first incidence surface and a first reflection surface facing the first incidence surface and forming a second angle with the first emission surface, a second prism having the first refractive index and including a second incidence surface in contact with the first emission surface and a second emission surface facing the second incidence surface and forming a third angle with the second incidence surface, a third prism having a second refractive index and including a third incidence surface in contact with the second emission surface and a third emission surface facing the third incidence surface forming a fourth angle with the third incidence surface, a film attached on the third emission surface of the third prism and cooperating with the third emission surface to emit the light beam striking the third incidence surface from the second emission surface as a first emitted light beam, and to reflect a second incident light beam striking the third emission surface and emit it as a second emitted light beam. The first prism shapes the incident light beam with a wavelength striking the first incidence surface at an incident angle, and makes the light beam reflected at the first reflection surface parallel to the optical axis of the second prism and strike the second incidence surface, the second emission surface and the third incidence surface are defined so as to cancel the change of an optical axis caused by the change of the wavelength of the incident light beam.

In the present optical element, preferably, the first incident light beam and the first emitted light beam are in the same plane.

Preferably, the plane defined by the direction of the first incident light beam and the direction of the the first emitted light beam substantially perpendicularly intersects the first incidence surface, the first reflection surface, and the first emission surface of the first prism, the second incidence surface and the second emission surface of the second prism, and the third incidence surface, and the third emission surface of the third prism.

In the present optical element, the incidence angle of the first incident light beam, the first and second refractive indexes, the first angle formed by the first incidence surface and the first emission surface, the second angle formed by the first reflection surface and the first emission surface, the third angle formed by the second incidence surface and the second emission surface, and the fourth angle formed by the third incidence surface and the third emission surface are defined so that the direction of the first incident light beam is substantially opposite and parallel to the direction of the second emitted light beam, and the direction of the first incident light beam is substantially perpendicular with the direction of the first emitted light beam.

In this optical element, preferably, the beam magnification in the plane defined by the direction of the incident light beam and the direction of the emitted light beam is approximately 1.5 to approximately 2.2.

The film may comprise a translucent film or a polarization film.

A fourth optical element according to the present invention comprises a first prism having a first refractive index and including a first incidence surface and a first emission surface forming a first angle with the first incidence surface and a first reflection surface facing the first incidence surface and forming a second angle with the first emission surface, a second prism having the first refractive index and including a second incidence surface in contact with the first emission surface and a second emission surface facing the second incidence surface and forming a third angle with the second incidence surface, and a film attached on the second emission surface of the second prism and cooperating with the second emission surface to emit the light beam striking the second emission surface from the first emission surface as a first emitted light beam, and to reflect a second incident light beam striking the second emission surface and emit it as a second emitted light beam. The first prism shapes the incident light beam with a wavelength striking the first incidence surface at an incident angle, and makes the light beam reflected at the first reflection surface parallel to the optical axis of the second prism and strike the second incidence surface. The first emission surface and the second incidence surface are defined so as to cancel the change of an optical axis caused by the change of the wavelength of the incident light beam.

In this optical element, preferably, the first incident light beam and the first emitted light beam are in the same plane.

Preferably, the plane defined by the direction of the first incident light beam and the direction of the first emitted light beam substantially perpendicularly intersects the first incidence surface, the first reflection surface, and the first emission surface of the first prism, and the second incidence surface and the second emission surface of the second prism.

In this optical element, the incidence angle of the first incident light beam, the first and second refractive indexes, the first angle formed by the first incidence surface and the first emission surface, the second angle formed by the first reflection surface and the first emission surface, the third angle formed by the second incidence surface and the second emission surface are defined so that the direction of the first incident light beam is substantially opposite and parallel to the direction of the second emitted light beam, and the direction of the first incident light beam in substantially perpendicular with the direction of the first emitted light beam.

Preferably, the beam magnification in the plane defined by the direction of the incident light beam and the direction of the emitted light beam is approximately 1.5 to approximately 2.2.

The film may comprise a translucent film or a polarization film.

A first optical pick-up according to the present invention comprises an optical element, a light source for generating a light beam to strike the optical element, an objective lens for converging the light beam emitted from the optical element, and a photodetector for detecting the emitted light beam from the optical element. The optical element comprises a first prism having a first refractive index and including a first incidence surface and a first emission surface forming a first angle with the first incidence surface and a first reflection surface facing the first incidence surface and forming a second angle with the first emission surface, a second prism having a second refractive index and including a second incidence surface in contact with the first emission surface and a second emission surface facing the second incidence surface, a third prism having the second refractive index and including a third incidence surface in contact with the second emission surface and a first incidence-emission surface forming a fourth angle with the third incidence surface and a third emission surface forming a fifth angle with the third incidence surface, a film between the second emission surface and the third incidence surface and cooperating with the second emission surface and the third incidence surface to emit the light beam striking the third incidence surface from the second emission surface as a first emitted light beam through the first incidence-emission surface, and to emit a second incident light beam striking the third incidence surface from the first incidence-emission surface as a second emitted light beam through the third emission surface.

The first prism shapes the incident light beam with a wavelength striking the first incidence surface at an incident angle, and makes the light beam reflected at the first reflection surface parallel to the optical axis of the second prism and strike the second incidence surface.

The first emission surface and the second incidence surface are defined so as to cancel the change of an optical axis caused by the change of the wavelength of the incident light beam.

The optical element is formed so that the first incident light beam and the first emitted light beam are in the same plane, and the plane defined by the direction of the first incident light beam and the direction of the first emitted light beam substantially perpendicularly intersects the first incidence surface, the first reflection surface, and the first emission surface of the first prism, the second incidence surface and the second emission surface of the second prism, and the third incidence surface, the first incidence-emission surface, and the third emission surface of the third prism, and the direction of the first incident light beam is substantially opposite and parallel to the direction of the second emitted light beam, and the direction of the first incident light beam is substantially perpendicular with the direction of the first emitted light beam.

The light source is positioned in front of the first incidence surface of the first prism, the objective lens is positioned in front of the first incidence-emission surface of the third prism, the photodetector is positioned in front of the third emission surface of the third prism.

In this optical pick-up the light source is a semiconductor laser that generates the first incident light beam, and the beam magnification in the plane defined by the direction of the incident light beam and the direction of the emitted light beam is approximately 1.9 to approximately 2.1.

The first prism shapes the incident light beam with a wavelength striking the first incidence surface at an incident angle substantially into a light beam having a circular sectioned shape.

The film may comprise a translucent film or a polarization film.

A second optical pick-up according to the present invention comprises an optical element, a light source for generating a light beam to strike the optical element, an objective lens for converging the light beam emitted from the optical element, and a photodetector for detecting the emitted light beam from the optical element. The optical element comprises a first prism having a first refractive index and including a first incidence surface and a first emission surface forming a first angle with the first incidence surface and a first reflection surface forming a second angle with the first incidence surface, a second prism having a second refractive index and including a second incidence surface in contact with the first emission surface and a second emission surface forming a fourth angle with the second incidence surface, a film between the first emission surface and the second incidence surface and cooperating with the first emission surface and the second incidence surface to emit the light beam striking the second incidence surface from the first emission surface as a first emitted light beam through the first incidence-emission surface, and to emit a second incident light beam striking the second incidence surface from the first incidence-emission surface as a second emitted light beam through the second emission surface.

The first prism shapes the incident light beam with a wavelength striking the first incidence surface at an incident angle, and makes the light beam reflected at the first reflection surface parallel to the optical axis of the second prism and strike the second incidence surface.

The first emission surface and the second incidence surface are defined so as to cancel the change of an optical axis caused by the variation of the wavelength of the incident light beam.

In this optical element, the first incident light beam and the first emitted light beam are in the same plane.

The plane defined by the direction of the first incident light beam and the direction of the first emitted light beam substantially perpendicularly intersects the first incidence surface, the first reflection surface, and the first emission surface of the first prism, and the second incidence surface, the second incidence-emission surface, and the second emission surface of the second prism.

The direction of the first incident light beam is substantially opposite and parallel to the direction of the second emitted light beam, and the direction of the first incident light beam is substantially perpendicular with the direction of the first emitted light beam.

The light source is positioned in front of the first incidence surface of the first prism, the objective lens is positioned in front of the first incidence-emission surface of the second prism, and the photodetector is positioned in front of the second emission surface of the second prism.

The light source is a semiconductor laser that generates the first incident light beam, and the beam magnification in the plane defined by the direction of the incident light beam and the direction of the emitted light beam is approximately 1.9 to approximately 2.1.

The first prism shapes the incident light beam with a wavelength striking the first incidence surface at an incident angle substantially into a circular light beam.

The film may be a translucent film or a polarization film.

A third optical pick-up according to the present invention comprises an optical element, a light source for generating a light beam to strike the optical element, an objective lens for converging the light beam emitted from the optical element, and a photodetector for detecting the emitted light beam from the optical element. The optical element comprises a first prism having a first refractive index and including a first incidence surface and a first emission surface forming a first angle with the first incidence surface and a first reflection surface facing the first incidence surface and forming a second angle with the first emission surface, a second prism having the first refractive index and including a second incidence surface in contact with the first emission surface and a second emission surface facing the second incidence surface and forming a third angle with the second incidence surface, a third prism having a second refractive index and including a third incidence surface in contact with the second emission surface and a third emission surface facing the third incidence surface forming a fourth angle with the third incidence surface, a film attached on the third emission surface of the third prism and cooperating with the third emission surface to emit the light beam striking the third incidence surface from the second emission surface as a first emitted light beam, and to reflect a second incident light beam striking the third emission surface and emit it as a second emitted light beam.

The first prism shapes the incident light beam with a wavelength striking the first incidence surface at an incident angle, and makes the light beam reflected at the first reflection surface parallel to the optical axis of the second prism and strike the second incidence surface.

The second emission surface and the third incidence surface are defined so as to cancel the change of an optical axis caused by the variation of the wavelength of the incident light beam.

The optical element is formed so that the first incident light beam and the first emitted light beam are in the same plane, and the plane defined by the direction of the first incident light beam and the direction of the first emitted light beam substantially perpendicularly intersects the first incidence surface, the first reflection surface, and the first emission surface of the first prism, the second incidence surface and the second emission surface of the second prism, and the third incidence surface, and the third emission surface of the third prism, and the direction of the first incident light beam is substantially opposite and parallel to the direction of the second emitted light beam, and the direction of the first incident light beam is substantially perpendicular with the direction of the first emitted light beam.

The light source is positioned in front of the first incidence surface of the first prism, the objective lens is positioned in front of the first incidence-emission surface of the third prism, the photodetector is positioned in front of the third emission surface of the third prism.

The light source is a semiconductor laser that generates the first incident light beam, and the beam magnification in the plane defined by the direction of the incident light beam and the direction of the emitted light beam is approximately 1.9 to approximately 2.1.

The first prism shapes the incident light beam with a wavelength striking the first incidence surface at an incident angle substantially into a circular light beam.

The film may be a translucent film or a polarization film.

A fourth optical pick-up according to the present invention comprises an optical element, a light source for generating a light beam to strike the optical element, an objective lens for converging the light beam emitted from the optical element, and a photodetector for detecting the emitted light beam from the optical element. The optical element comprises a first prism having a first refractive index and including a first incidence surface and a first emission surface forming a first angle with the first incidence surface and a first reflection surface facing the first incidence surface and forming a second angle with the first emission surface, a second prism having the first refractive index and including a second incidence surface in contact with the first emission surface and a second emission surface facing the second incidence surface and forming a third angle with the second incidence surface, a film attached on the second emission surface of the second prism and cooperating with the second emission surface to emit the light beam striking the second emission surface from the first emission surface as a first emitted light beam, and to reflect a second incident light beam striking the second emission surface and emit it as a second emitted light beam. The first prism shapes the incident light beam with a wavelength striking the first incidence surface at an incident angle, and makes the light beam reflected at the first reflection surface parallel to the optical axis of the second prism and strike the second incidence surface, the first emission surface and the second incidence surface are defined so as to cancel the change of an optical axis caused by the variation of the wavelength of the incident light beam.

The optical element is formed so that the first incident light beam and the first emitted light beam are in the same plane, and the plane defined by the direction of the first incident light beam and the direction of the first emitted light beam substantially perpendicularly intersects the first incidence surface, the first reflection surface, and the first emission surface of the first prism, the second incidence surface and the second emission surface of the second prism, and the direction of the first incident light beam is substantially opposite and parallel to the direction of the second emitted light beam, and the direction of the first incident light beam is substantially perpendicular with the direction of the first emitted light beam.

The light source in positioned in front of the first incidence surface of the first prism, the objective lens is positioned in front of the second emission surface of the second prism along the direction of the first emitted light beam, the photodetector is positioned in front of the second emission surface of the second prism along the direction of the second emitted light beam.

In this optical pick-up, the light source is a semiconductor laser that generates the first incident light beam, and the beam magnification in the plane defined by the direction of the incident light beam and the direction of the emitted light beam is approximately 1.9 to approximately 2.1.

The first prism shapes the incident light beam with a wavelength striking the first incidence surface at an incident angle substantially into a circular light beam.

The film may be a translucent film or a polarization film.

BRIEF DESCRIPTION OF THE DRAWINGS

These and other objects and features of the present invention will become clearer from the following description of the preferred embodiments given with reference to the accompanying drawings, in which:

FIG. 9A and FIG. 9B are views illustrating values of first refractive indexes, incidence angles, refraction angles, beam magnification etc. in the prism shown in FIG. 8;

DESCRIPTION OF THE PREFERRED EMBODIMENTS

Below, preferred embodiments will be described with reference to the accompanying drawings.

Below, embodiments of the present invention will be explained in detail with reference to the attached drawings.

First Embodiment

Figure 1:
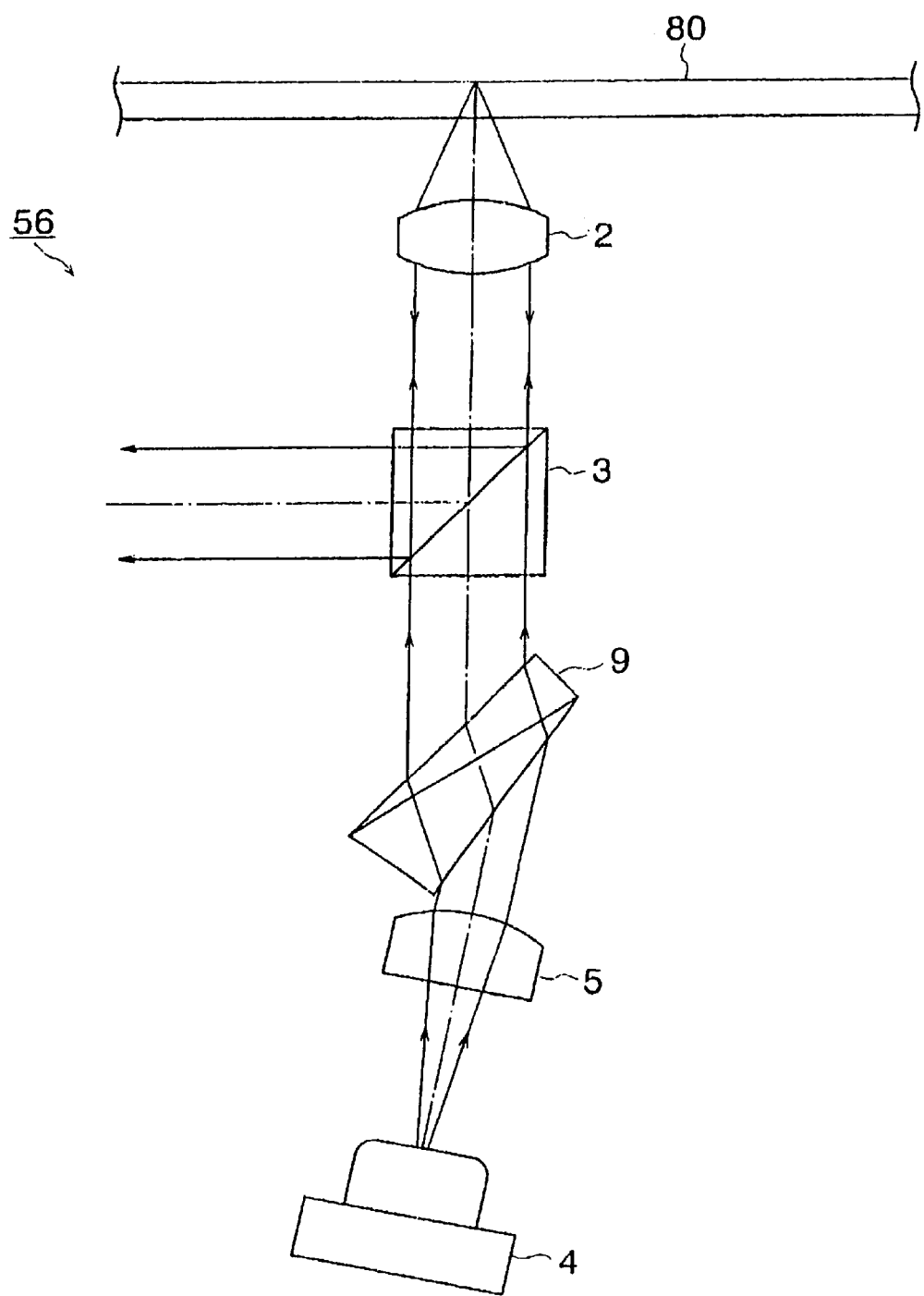
FIG. 1 is a schematic view of the configuration of an example of the related art of an optical pick-up.
Figure 2:
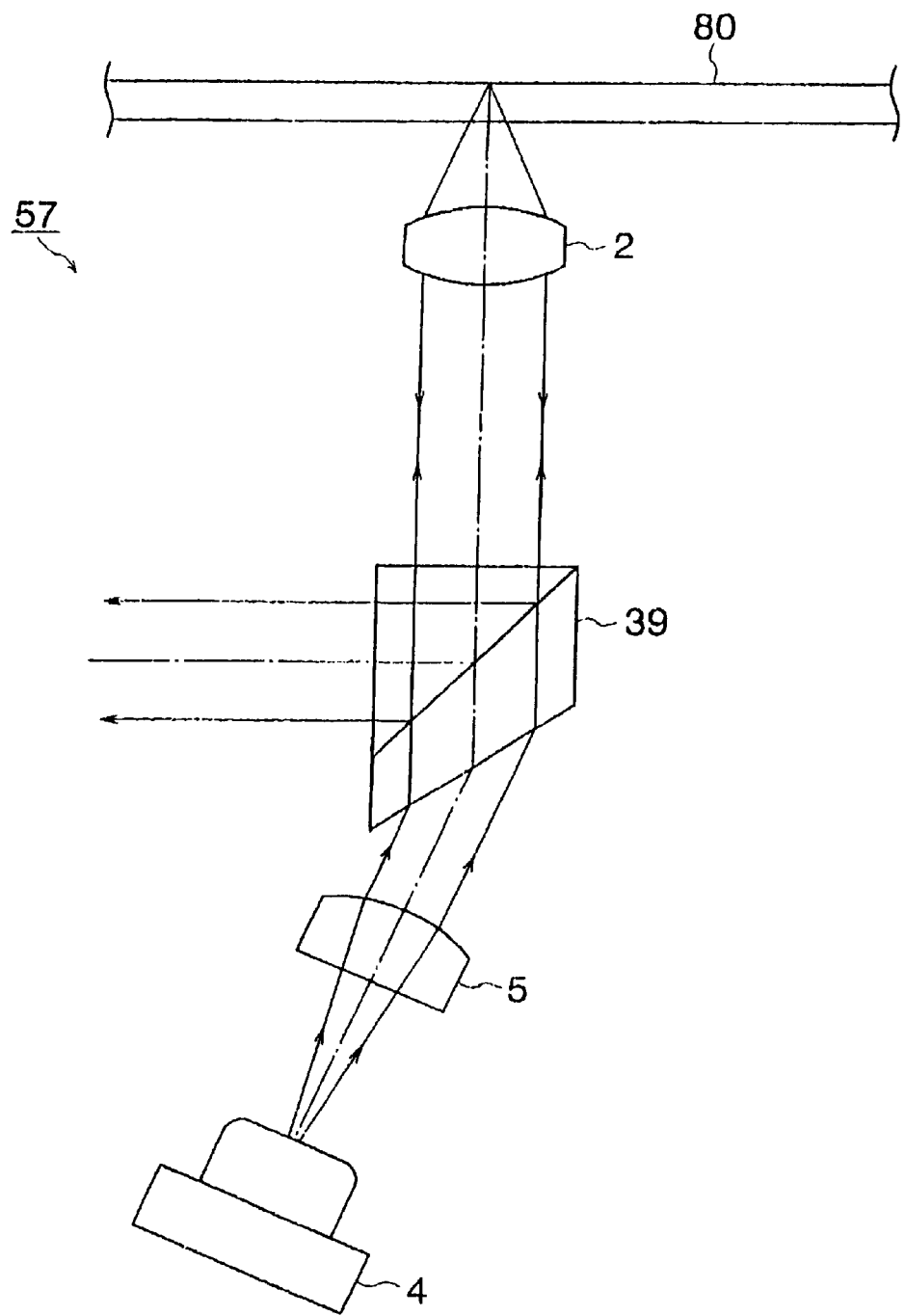
FIG. 2 is a schematic view of the configuration of another example of the related art of an optical pick-up.
Figure 3:
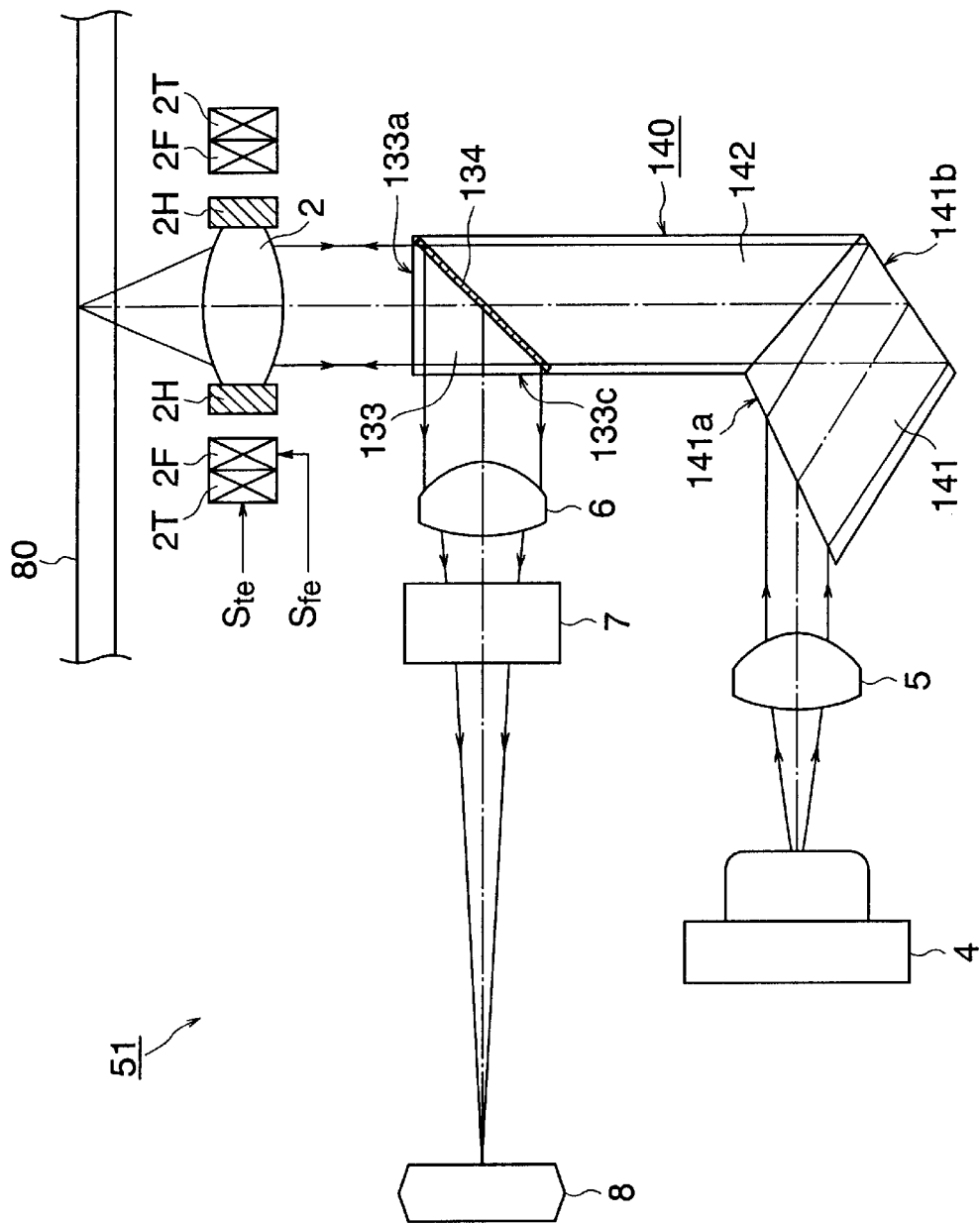
FIG. 3 is a schematic view of the configuration of a first embodiment of an optical pick-up according to the present invention.

FIG. 3 is a schematic view of the configuration of a first embodiment of an optical pick-up according to the present invention.

The optical pick-up 51 comprises a semiconductor laser 4, a collimator lens 5, an optical element, that is, a beam shaping prism 140, an objective lens 2, a condenser lens 6, a cylindrical lens 7, a photodetector 8, a focusing actuator 2F, a tracking actuator 2T, and a lens holder 2H.

The semiconductor laser 4 emits a linearly polarized laser beam to the collimator lens 5.

The collimator lens 5 collimates the laser beam from the semiconductor laser 4 to make it a parallel beam directing to the beam shaping prism 140.

The beam shaping prism 140 shapes the laser beam from the collimator lens 5 and emits it to the objective lens 2.

The objective lens 2 converges the laser beam from the beam shaping prism 140 and emits it to an optical disk 80 to form a beam spot on the recording surface of the optical disk 80. In addition, the objective lens 2 returns the laser beam reflected from the optical disk 80 (reflected laser beam) to the beam shaping prism 140.

The beam shaping prism 140 is struck by the laser beam from the objective lens 2, reflects it by a film 134, and emits it to the condenser lens 6.

The condenser lens 6 converges the light beam from the shaping prism 140 and emits it to the cylindrical lens 7.

The cylindrical lens 7 passes the light beam coming from the condenser lens 6 and emits it to the photodetector 8.

The photodetector 8 receives the laser beam from the beam shaping prism 140 at the receiving unit and generates an output signal.

The photodetector 8 for example is comprised of a four-part split photodetector formed by equally dividing the receiving unit by two perpendicular division lines. The two perpendicular division lines and the generator line of the cylindrical lens 7 are arranged so that they form an angle of approximately 45° or 135°. Due to this arrangement, focusing can be controlled (or focusing error can be detected) by the astigmatism method.

The objective lens 2 is held by the lens holder 2H.

Based on a driving signal Sfe, the focusing actuator 2F causes the lens holder 2H to move in the focusing direction perpendicular to the recording surface of the optical disk 80, thus the objective lens 2 is moved in the focusing direction.

Based on a driving signal Ste, the tracking actuator 2T causes the lens holder 2H to move in the radial direction of the optical disk 80, thus the objective lens 2 is moved in the radial direction of the optical disk 80.

The driving signal Sfe, for example, is obtained by compensating (phase compensating and/or frequency compensating) and amplifying the focusing error signal generated based on the output signal of the photodetector 8.

The driving signal Ste, for example, is obtained by compensating (phase compensating and/or frequency compensating and amplifying the tracking error signal generated based on the output signal of the photodetector 8.

The laser beam from the semiconductor laser 4 has a spread angle in the vertical direction different from that in the horizontal direction, so the sectional shape of the output laser beam is elliptical or near elliptical.

The beam shaping prism 140 changes the sectional shape of the laser beam from the semiconductor laser 4 from an ellipse to a circle at the incidence surface 141a and makes the diameter of the beam in the long axis direction and short axis direction equal or substantially equal. In this way, the beam shaping prism 140 spreads the incident light beam in one direction.

Further, the beam shaping prism 140 also functions as a beam splitter. It reflects a light beam passing through the incidence surface 141a at the reflecting surface 141b, passes it through the film 134 and an incidence-emission surface 133a, and emits it to the objective lens 2. At the same time, the light beam reflected by the optical disk 80 is returned via the objective lens 2. This light beam is reflected on the film 134 and is emitted to the photodetector 8. Due to the provision of the reflecting surface 141b in the forward path, the change of the optical axis of the emitted light beam of the beam shaping prism 140 caused by the inclination of the beam shaping prism is reduced.

Furthermore, by making the optical axis of the light beam emitted from the third surface 133c of the third prism 133 opposite in direction to the direction of the incident light beam, it is possible to arrange the semiconductor laser 4 and collimator 5 and the photodetector 8 and condenser lens 6 aligned in the direction of the disk rotation axis and possible to make the optical pick-up 51 smaller.

The beam shaping prism 140 includes a first prism 141 having a first refractive index, and a second prism 142 and third prism 133 having a second refractive index. Since the beam shaping prism 140 comprises the first prism 141 and the second prism 142 joined together, even if the wavelength ($\lambda$) of the light beam emitted from the semiconductor laser 4 changes, a change of the optical axis due to this wavelength change is reduced.

As described above, the beam shaping prism 140 has the four functions of (1) beam shaping, (2) suppression of change of the optical axis induced by wavelength variation (achromatic correction), (3) beam splitting, and (4) reduction of the change of the optical axis of the light beam emitted from this beam splitter caused by the inclination of the beam shaping prism 140.

Figure 4:
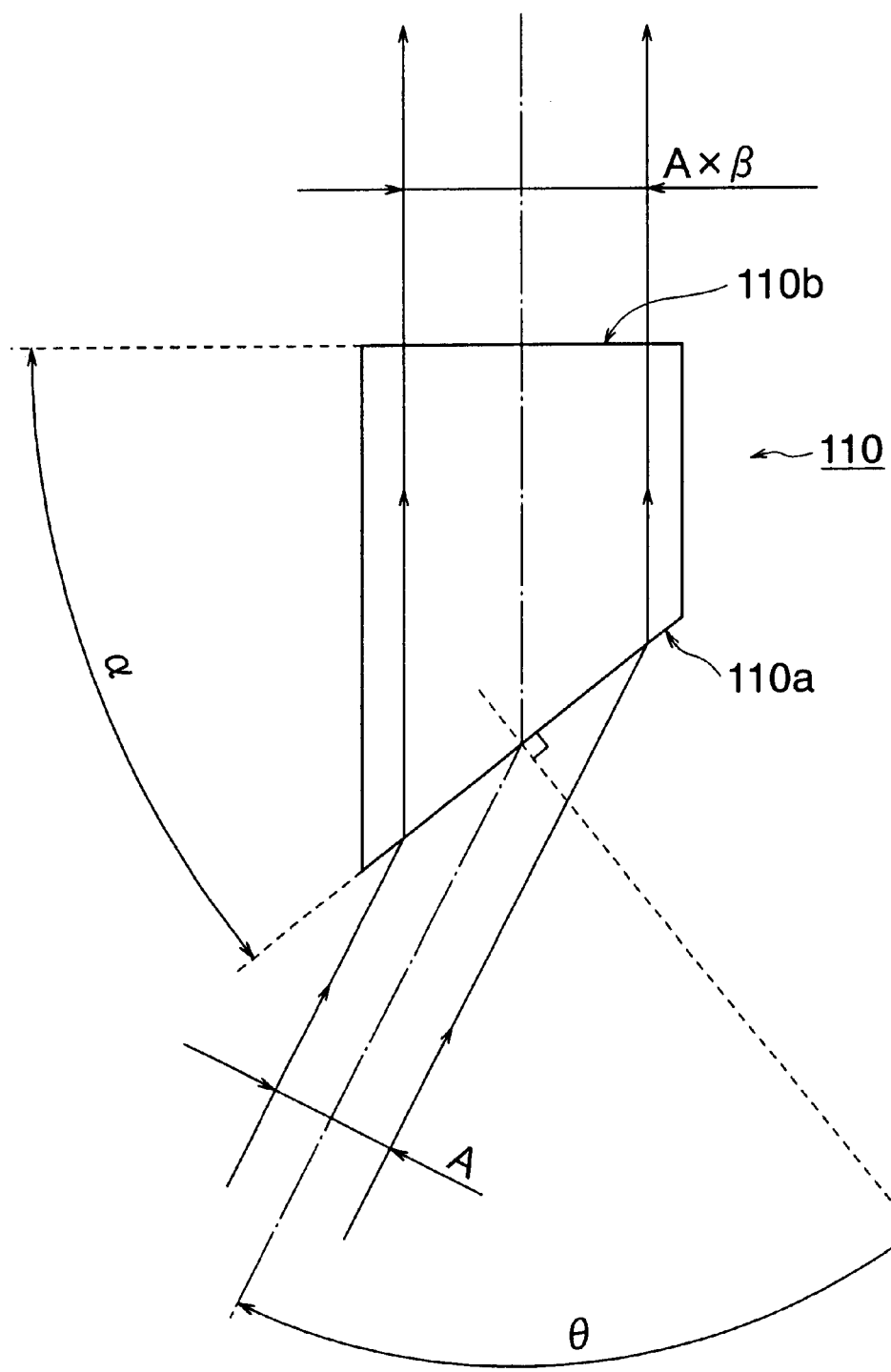
FIG. 4 is a schematic view of the configuration of a prism having the function of beam shaping out of the four functions of the beam shaping prism in FIG. 3.

FIG. 4 is a schematic view of a prism having the function of beam shaping out of the four functions of the beam shaping prism 140.

This prism 110 has a first surface 110a and a second surface 110b, has an angle ($\alpha$) between the first surface 110a and the second surface 110b, and constitutes a beam shaping prism.

When a light beam striking the first surface 110a of the prism 110 at an incident angle ($\theta$) is emitted from the second surface 110b, the diameter of the beam is enlarged $\beta$-fold in the plane defined by directions of the incident light beam and the emitted light beam. That is, the beam magnification (beam shaping) is $\beta$.

Because the refractive index of the prism 110 is dependent on the wavelength and therefore the refractive index changes due to a change of the wavelength of incident light beam, the optical axis of the emitted light beam changes.

Figure 5:
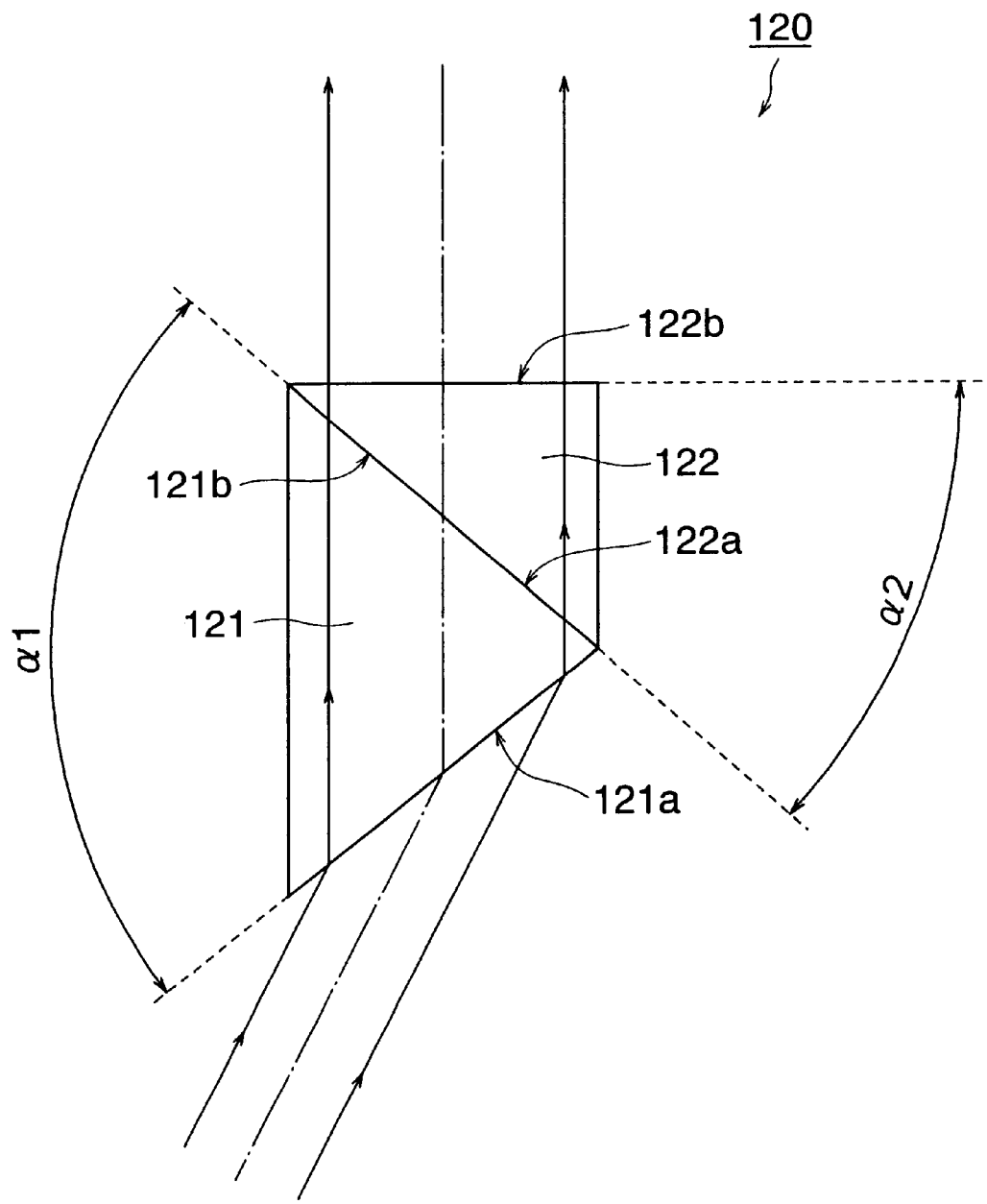
FIG. 5 is a schematic view of the configuration of a prism having the functions of beam shaping and achromatic correction out of the four functions of the beam shaping prism in FIG. 3.

Thereupon, as with the prism 120 shown in FIG. 5, by sticking together at least two types of prisms having different refractive indexes (dispersion) at predetermined angles $\alpha 1$, α2, it is possible to cancel out the change of the optical axis due to wavelength variation and possible to give an achromatic correction function.

FIG. 5 is a schematic view explaining a prism having the function of beam shaping and achromatic correction out of the four functions of the beam shaping prism 140.

This prism 120 includes a first prism 121 having a first refractive index and a second prism 122 having a second refractive index.

The first prism 121 comprises a first surface 121a and a second surface 121b. The angle between the first surface 121a and the second surface 121b is α1.

The second prism 122 comprises a first surface 122a and a second surface 122b. The angle between the first surface 122a and the second surface 122b is α2.

The second surface 121b of the first prism 121 is joined with the first surface 122a of the second prism 122.

The prism 120 is struck by and shapes a light beam from the first surface 121a of the first prism 121, refracts the light beam refracted at the first surface 121a of the first prism 121 at the joined surfaces of the first prism 121 and the second prism 122 for achromatic correction, and refracts the light beam refracted at the joined surfaces at the second surface 122b of the second prism 122 to form an emitted light beam. In this way, an achromatic prism is formed.

Figure 6:
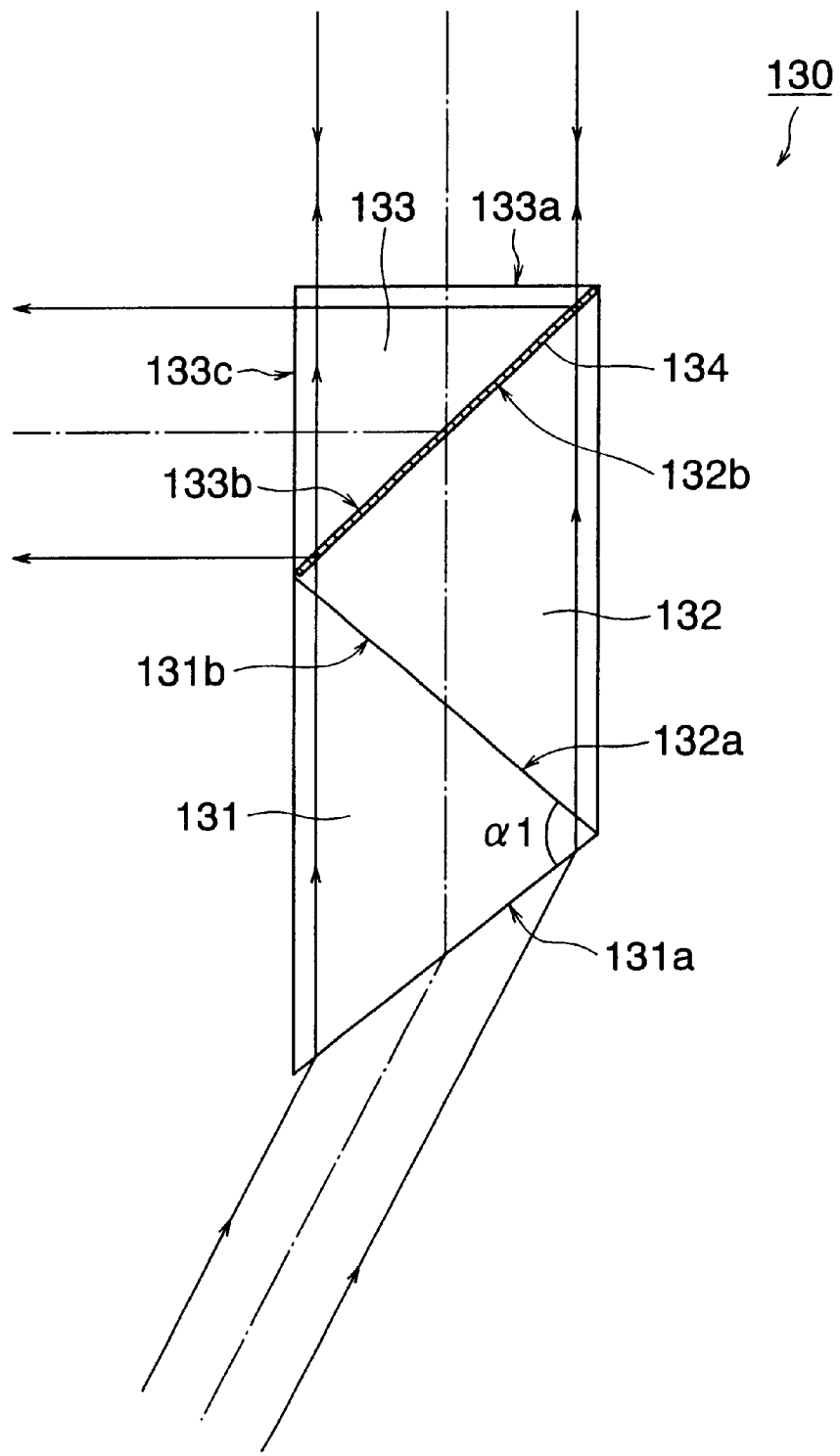
FIG. 6 is a schematic view of the configuration of a prism having the functions of beam shaping, achromatic correction, and beam splitting out of the four functions of the beam shaping prism in FIG. 3.

FIG. 6 is a schematic view explaining a prism having the functions of beam shaping, achromatic correction, and beam splitting out of the four functions of the beam shaping prism 140.

This prism 130 includes a first prism 131 having a first refractive index, a second prism 132 and a third prism 133 having a second refractive index, and a film 134.

The first prism 131 comprises a first surface 131a and a second surface 131b.

The second prism 132 comprises a first surface 132a and a second surface 132b.

The third prism 133 comprises a first surface 133a, a second surface 133b, and a third surface 133c.

The second surface 131b of the first prism 131 is joined with the first surface 132a of the second prism 132.

The second surface 132b of the second prism 132 is joined with the second surface 133b of the third prism 133 with the film 134 between them. The film 134 may be for example a polarization film or a translucent film.

The prism 130 is struck by and shapes an incident light beam from the first surface 131a of the first prism 131, refracts the light beam refracted at the first surface 131a of the first prism 131 at first joined surfaces of the first prism 131 and the second prism 132 for achromatic correction, passes the light beam refracted at the first joined surfaces through the second joined surfaces of the second prism 132 and the third prism 133, and refracts the light beam passed through the second joined surfaces at the first surface 133a of the third prism 133 to form an emitted light beam directing, for example, to an optical disk.

The prism 130 is struck by a light beam from the direction of the above light beam emitted from the first surface 133a of the third prism 133, refracts the light beam refracted at the first surface 133a of the third prism 133, and refracts and emits the light beam reflected at the film 134 at the third surface 133c of the third prism 133. The light beam emitted from the third prism 133 is, for example, directed to a photodetector.

If the prism 130 tilted, the change of the optical axis of the light beam emitted from the first surface 133a of the third prism 133 is small, but the change of the optical axis of the light beam reflected at the film 134 and emitted from the third surface 133c becomes large. In this case, positional deviation of the light beam emitted to the photodetector takes place and therefore error is included in the output signal of the photodetector.

Figure 7:
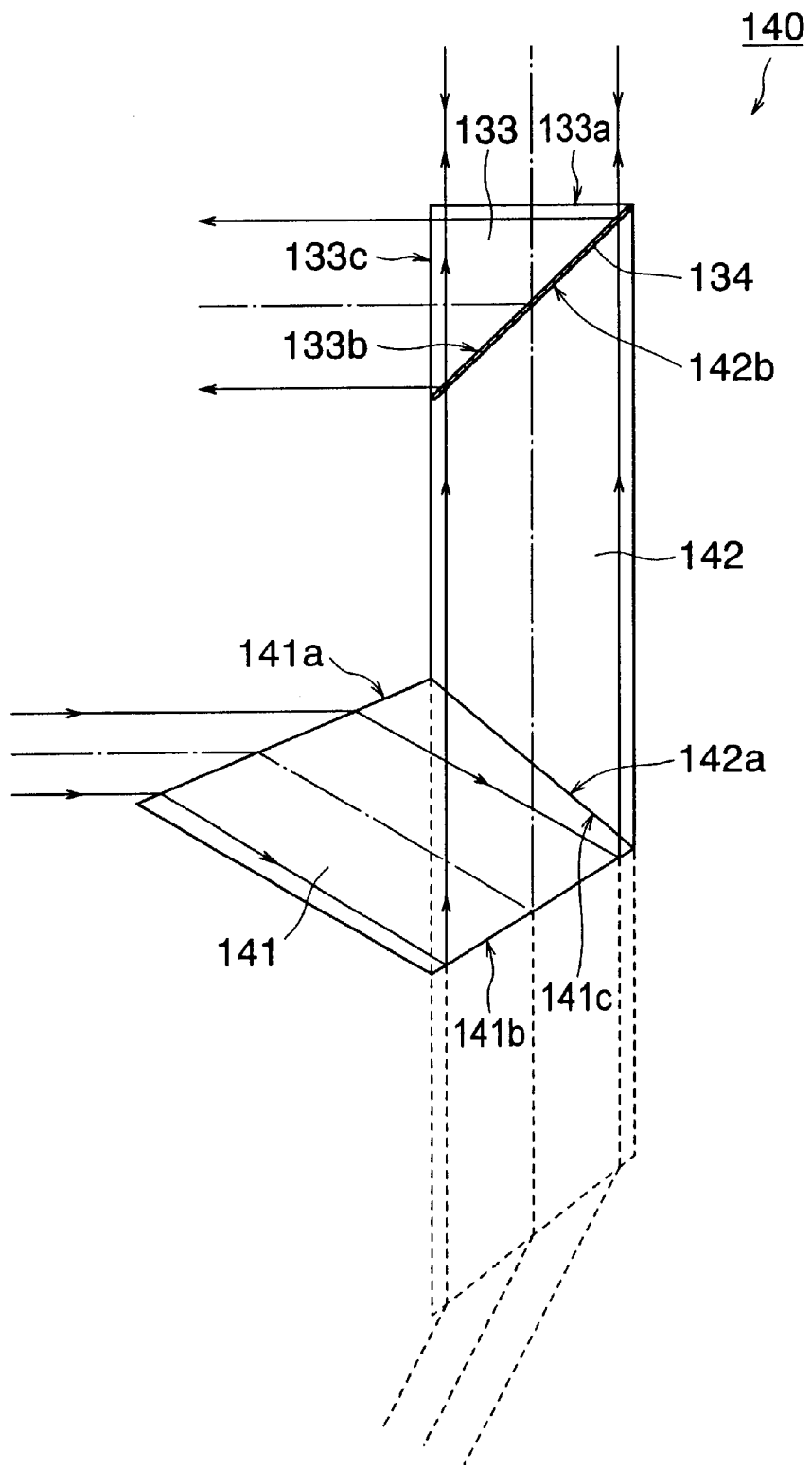
FIG. 7 is a schematic view of the configuration of a beam shaping prism in FIG. 3.

FIG. 7 is a view explaining a beam shaping prism 140 in FIG. 3. Note that the same reference numerals are assigned to components the same as in the prism 130 of FIG. 6, and explanations of these same components are suitably omitted.

This prism 140 includes a first prism 141 having a first refractive index, a second prism 142 and third prism 133 having a second refractive index, and a film 134.

The first prism 141 comprises a first surface 141a, a second surface 141b, and a third surface 141c.

The second prism 142 comprises a first surface 142a and a second surface 142b.

The third prism 133 comprises a first surface 133a, a second surface 133b, and a third surface 133c.

The third surface 141c of the first prism 141 is joined with the first surface 142a of the second prism 142.

The second surface 142b of the second prism 142 is joined with the second surface 133b of the third prism 133 with the film 134 between them.

The prism 140 is struck by and shapes an incident light beam from the first surface 141a of the first prism 141, reflects the light beam refracted at the first surface 141a of the first prism 141 at the second surface 141b of the first prism 141, refracts the light beam reflected at the second surface 141b of the first prism 141 at the first joined surfaces of the first prism 141 and the second prism 142 for achromatic correction, passes the light beam refracted at the first joined surfaces through the second joined surfaces of the second prism 142 and the third prism 133, and refracts the light beam passed through the second joined surfaces by the first surface 133a of the third prism 133 to form an emitted light beam.

The first prism 141, the second prism 142, and the third prism 133 are formed so that the direction of the incident light beam and the direction of the emitted light beam perpendicularly intersect or substantially perpendicularly intersect.

The prism 140 is struck by the light beam from the direction of the above light beam emitted from the first surface 133a of the third prism 133, reflects the light beam refracted at the first surface 133a of the third prism 133 at the film 134, refracts the light beam reflected at the film 134 at the third surface 133c of the third prism 133, and emits it in a direction substantially opposite and parallel to the direction of the incident light beam.

By providing the reflecting surface 141b in the forward path of the prism 140, it is possible to keep small the change of the optical axis of the light beam emitted from the third surface 133c of the third prism 133 caused by the inclination of the prism 140.

However, the change of the optical axis of the light beam emitted from the first surface 133a of the third prism 133 becomes large.

Therefore, the prism 140 is useful in a system where it is necessary to keep small the change of an optical axis of a light beam emitted from the third surface 133c of the third prism 133 rather than the change of the optical axis of the light beam emitted from the first surface 133a of the third prism 133.

Figure 8:
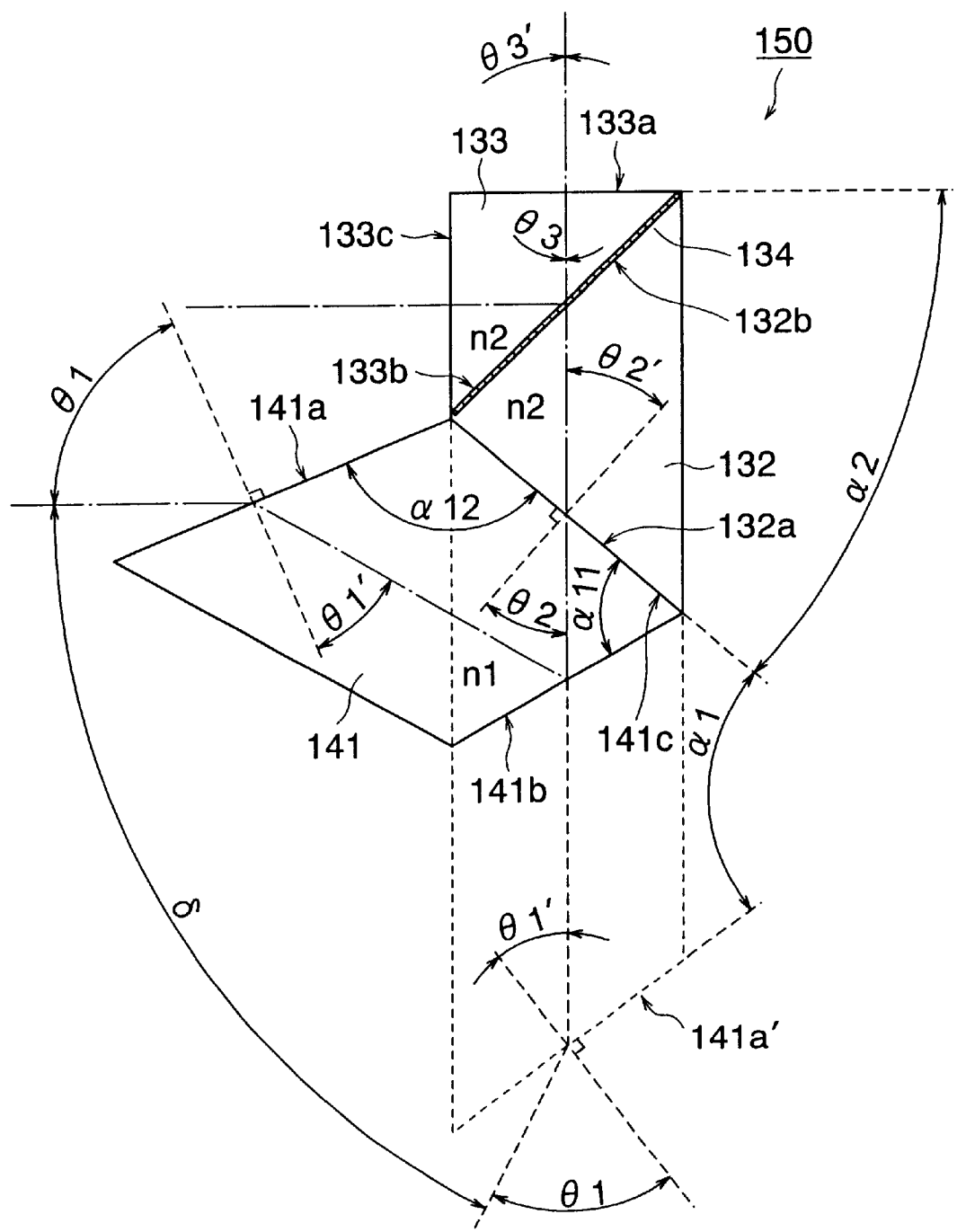
FIG. 8 is a schematic view of the configuration of a modification of the beam shaping prism in FIG. 7.

FIG. 8 is a schematic view of the configuration of a modification of the prism 140 of FIG. 7. The second prism 142 of the prism 140 of FIG. 7 is shortened in the forward direction. Note that the same reference numerals are assigned to the same components as in the prism 140 of FIG. 7, and explanations of these same components are suitably omitted.

This prism 150 includes a first prism 141 having a first refractive index n1, a second prism 132 and a third prism 133 having a second refractive index n2, and a film 134.

The first prism 141 comprises a first surface 141a, a second surface 141b, and a third surface 141c.

The second prism 132 comprises a first surface 132a and a second surface 132b.

The third prism 133 comprises a first surface 133a, a second surface 133b, and a third surface 133c.

The third surface 141c of the first prism 141 is joined with the first surface 132a of the second prism 132.

The second surface 132b of the second prism 132 is joined with the second surface 133b of the third prism 133 with the film 134 between them.

The prism 150 is struck with and shapes an incident light beam from the first surface 141a of the first prism 141, reflects the light beam refracted at the first surface 141a of the first prism 141 at the second surface 141b of the first prism 141, refracts the light beam reflected at the second surface 141b of the first prism 141 at the first joined surfaces of the first prism 141 and the second prism 132 for achromatic correction, passes the light beam refracted at the first joined surfaces through the second joined surfaces where the second prism 132 and the third prism 133 are joined, and refracts the light beam passed through the second joined surfaces at the first surface 133a of the third prism 133 to form an emitted light beam.

The first prism 141, the second prism 132, and the third prism 133 are formed so that the direction of the incident light beam and the direction of the emitted light beam perpendicularly or substantially perpendicularly intersect in the same plane.

The prism 150 is struck with a light beam from the direction of the above light beam emitted from the first surface 133a of the third prism 133, reflects the light beam refracted at the first surface 133a of the third prism 133 at a film 134, refracts the light beam reflected at the film 134 at the third surface 133c of the third prism 133, and emits it in a direction parallel to or a direction substantially parallel to the direction of the incident light beam and in a direction opposite to or a direction substantially opposite to the direction of the incident light beam.

By providing the reflecting surface 141b in the forward path of the prism 150, it is possible to keep small the change of the optical axis of the light beam emitted from the third surface 133c of the third prism 133 caused by the inclination of the prism 150.

However, the change of the optical axis of the light beam emitted from the first surface 133a of the third prism 133 becomes large.

Therefore, the prism 150 is useful in a system where it is necessary to keep small the change of an optical axis of a light beam emitted from the third surface 133c rather than the change of the optical axis of the light beam emitted from the first surface 133a of the third prism 133.

Further, as shown in the prisms 150 and 140, the distance between the optical axis of the light beam striking the first surface 141a and the optical axis of the light beam emitted from the third surface 133c can be adjusted by the lengths of the second prisms 132 and 142 in the forward direction.

In the view of the configuration of FIG. 8, the incidence angle of the incident light beam at the first surface 141a of the first prism 141 is θ1, while the refraction angle is θ1'.

The incidence angle of the light beam striking the first joined surfaces where the first prism 141 and the second prism 132 are joined is θ2, while the refraction angle is θ2'.

The first surface 141a and the third surface 141c of the first prism 141 form the angle α12.

The second surface 141b and the third surface 141c of the first prism 141 form the angle α11.

The incidence angle of the light beam emitted from the first surface 133a of the third prism 133 is θ3, while the refraction angle is θ3'.

The first joined surfaces where the first prism 141 and the second prism 132 are joined and the first surface 133a of the third prism 133 form an angle α2.

When projecting the prism 150 on a plane defined by the incident light beam and emitted light beam and folding back the first prism 141 at the second surface 141b, the optical axis of the incident light beam of the first plane 141a and the optical axis of the light beam incident on the projected line 141a' of the first surface 141a form the angle δ.

The above angles θ1 to θ3 and θ1' to θ3' satisfy equations (1) to (5) in equation system 1.

Further, the beam magnification β satisfies equation (6) and (7) in equation system 2.

[Equation System 1]

$$\theta1'=\sin^{-1}(\sin\theta1/n1) \quad (1)$$

$$\theta2=\theta1'-\alpha1 \quad (2)$$

$$\theta2'=\sin^{-1}(n1\times\sin\theta2/n2) \quad (3)$$

$$\theta3=\theta2'+\alpha2 \quad (4)$$

$$\theta3'=\sin^{-1}(n2\times\sin\theta3) \quad (5)$$

[Equation System 2]

$$\beta=(\cos\theta1'\times\cos\theta2'\times\cos\theta3')/\gamma \quad (6)$$

$$\gamma=\cos\theta1\times\cos\theta2\times\cos\theta3 \quad (7)$$

FIGS. 9A and 9B are views illustrating values of refractive indexes n1, n2, incidence angles θ1 to θ3, refractive indexes θ1' to θ3', beam magnification β, etc. in the prism 150 shown in FIG. 8.

When the wavelength λ of the incident light beam is approximately 395 nm, the refractive index n1 is approximately 1.53153, the second refractive index n2 is approximately 1.59307, the angle α1 is approximately 79.08°, and the angle α2 is approximately 41.21°. Further, the incidence angle θ1 is approximately 65.619°, the refraction angle θ1' is approximately 36.492°, the incidence angle θ2 is approximately 42.587°, the refraction angle is approximately θ2' 40.585°, the incidence angle is approximately θ3 0.628°, and the refraction angle θ3' in approximately 1.00°. The beam magnification β is approximately 2.009.

When the wavelength λ of the incident light beam is approximately 405 nm, the first refractive index n1 is approximately 1.53020, the second refractive index n2 is approximately 1.59059, the angle α1 is approximately 79.08°, and the angle α2 is approximately 41.21°. Further, the incidence angle θ1 is approximately 65.619°, the refraction angle θ1' is approximately 36.529°, the incidence angle θ2 is approximately 42.550°, the refraction angle θ2' is approximately 40.584°, the incidence angle θ3 is approximately 0.629°, and the refraction angle is approximately θ3' 1.00°. The beam magnification β is approximately 2.007.

When the wavelength λ of the incident light beam is approximately 415 nm, the first refractive index n1 is approximately 1.52897, the second refractive index n2 is approximately 1.56832, the angle α1 is approximately 79.08°, and the angle α2 is approximately 41.21°. Further, the incidence angle θ1 is approximately 65.619°, the refraction angle θ1' is approximately 36.563°, the incidence angle θ2 is approximately 42.516°, the refraction angle θ2' is approximately 40.583°, the incidence angle θ3 is approximately 0.628°, and the refraction angle θ3' is approximately 1.00°. The beam magnification β is approximately 2.005.

The angle δ is approximately 63.25°, the angle α11 is approximately 71.84°, and the angle α12 is approximately 115.41°.

By setting the refractive indexes, incidence angles, and refraction angles to the values shown in FIG. 9, it is possible to prevent the refraction angle θ3' of the light beam emitted from changing in the prisms 150 and 140 when the wavelength λ changes by ±10 nm about 405 nm.

The first prism 141 changes the direction of the optical axis in the forward path by the reflection surface 141b. The angle α11 formed by the reflecting surface 141b and the third surface 141c satisfies the following equation (8).

The angle α11 is closely associated with the angle formed by the optical axis before and the optical axis after reflection at the reflecting surface 141b. If the angle formed by the optical axis in the case of provision of the reflecting surface 141b and the optical axis in the case of no provision of the reflecting surface 141b is δ, the following equation (9) is satisfied.

[Equation System 3]

$$\alpha 12 = \alpha 1 - 2 \times \alpha 11 + 180° \quad (8)$$

$$\alpha 11 = 90° - \theta 1 + \alpha 1 - \delta/2 \quad (9)$$

Figure 10:
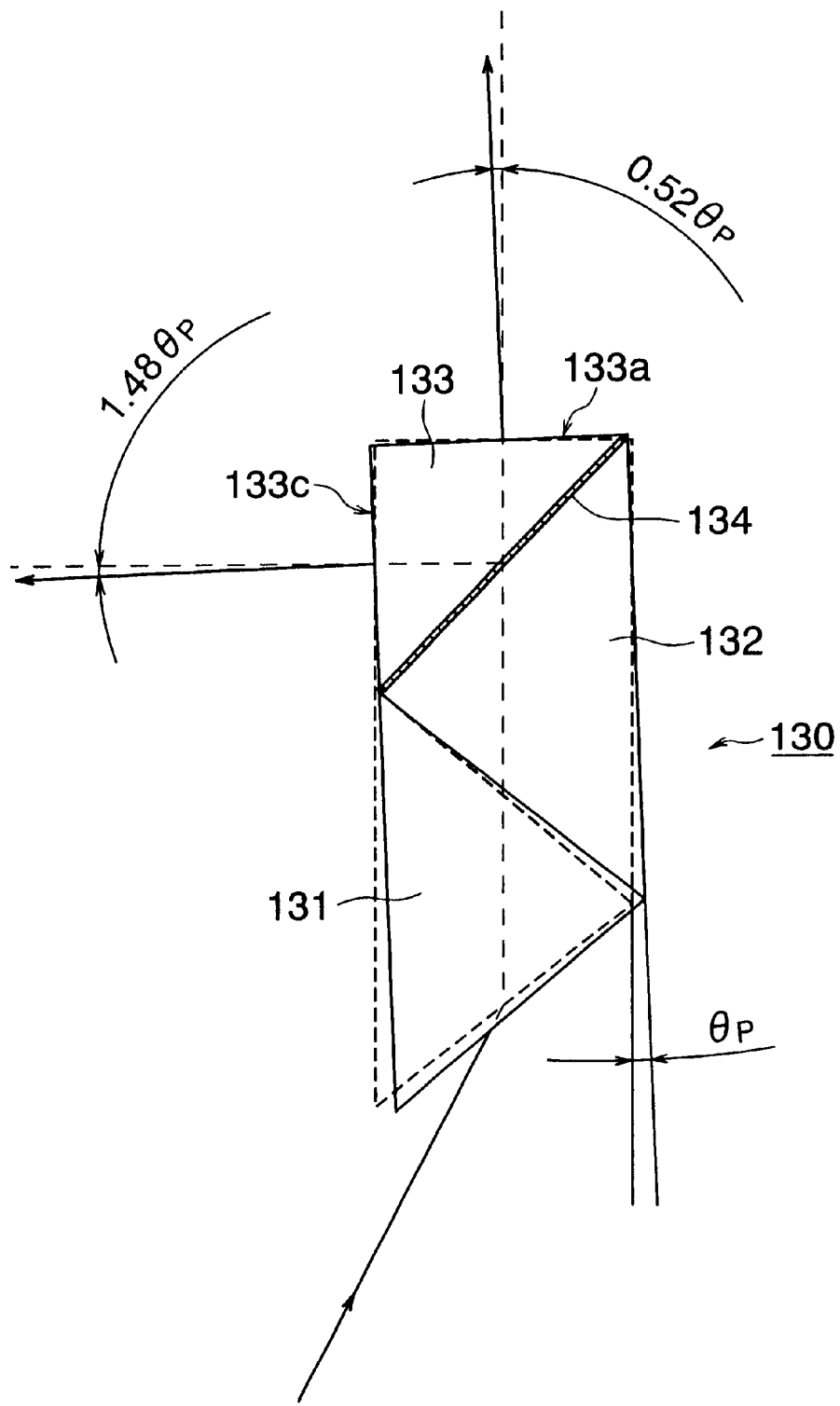
FIG. 10 is a view explaining the change of the optical axis when the prism shown in FIG. 6 is tilted.
Figure 11:
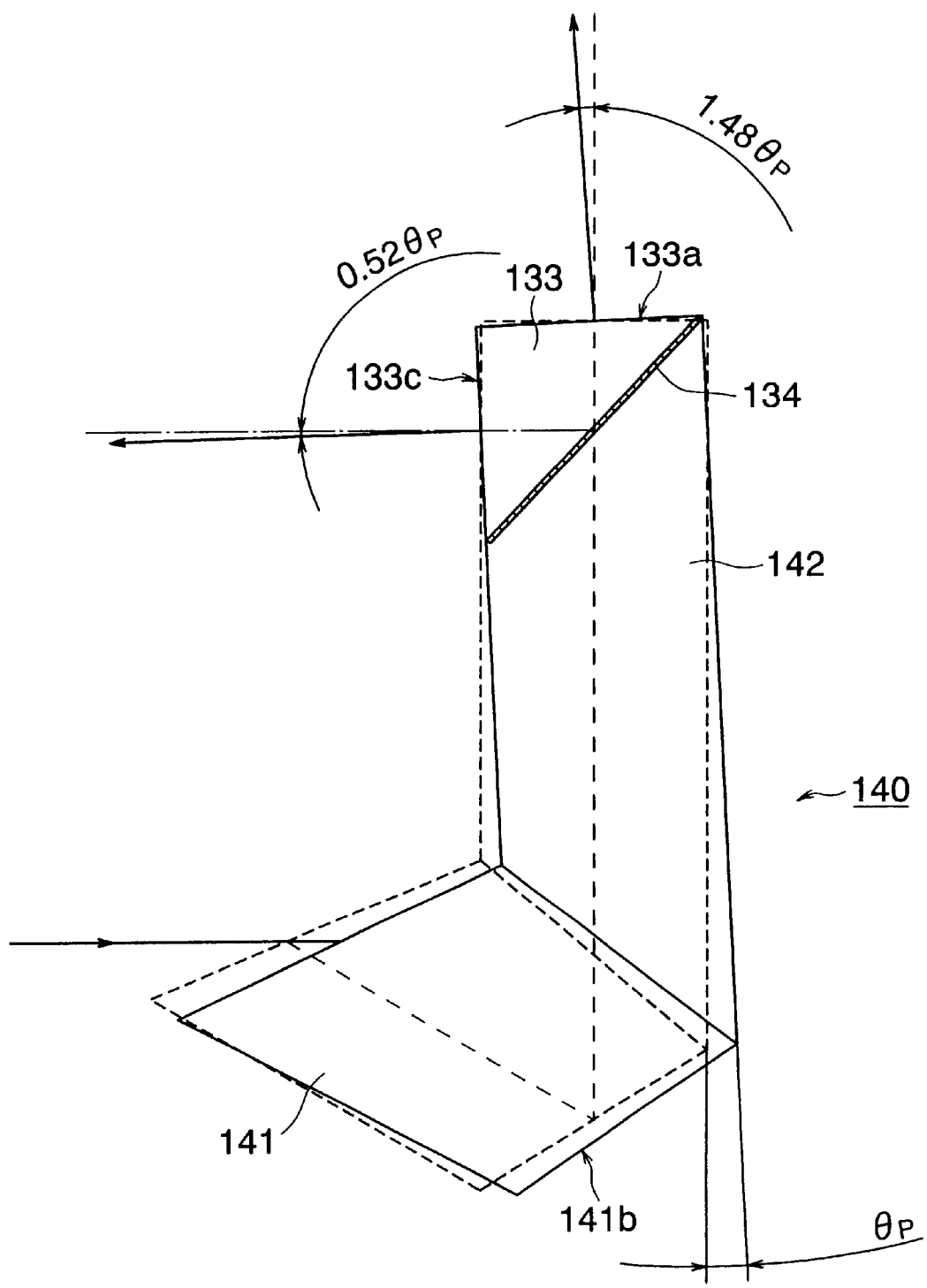
FIG. 11 is a view explaining the change of the optical axis when the prism shown in FIG. 7 is tilted.

FIG. 10 and FIG. 11 are views explaining the change of the optical axis when the prism is tilted. Note that the beam magnification β of the prisms 130 and 140 in FIG. 10 and FIG. 11 is 2 or substantially 2.

In the prism 130 of FIG. 10, if the prism 130 tilts by exactly an angle θp, the optical axis of the light beam omitted from the first surface 133a of the third prism 133 tilts by exactly 0.52 θp.

On the other hand, the light beam from the direction of the emitted light beam is reflected by the film 134 and is emitted from the third surface 133c of the third prism 133. The optical axis of this emitted light beam changes by exactly 1.48 θp.

Namely, when no reflecting surface is provided in the forward path, the change of the optical axis of the light beam emitted from the third surface 133c is three times as large as the change of the optical axis of the light beam emitted from the first surface 133a of the third prism 133.

In the prism 140 of FIG. 11, if the prism 140 tilts by exactly an angle θp, the optical axis of the light beam emitted from the first surface 133a of the third prism 133 changes by exactly 1.48 θp.

On the other hand, the light beam from the direction of the emitted light beam is reflected by the film 134 and is emitted from the third surface 133c of the third prism 133. The optical axis of this emitted light beam changes by exactly 0.52 θp.

Namely, when a reflecting surface 141b is provided in the forward path, the change of the optical axis of the light beam emitted from the third surface 133c is approximately one-third as small as the change of the optical axis of the light beam emitted from the first surface 133a of the third prism 133.

The deviation of the optical axis of the light beam emitted from the third surface 133c of the third prism 133 gives rise to positional deviation of the beam on the receiving surface of the photodetector and undesirably produces error in the output signal from the photodetector. If error occurs in the output signal of the photodetector, there is a possibility of error occurring in the focusing error signal, tracking error signal, replay signal, etc.

Therefore, in the prism 140, even if the prism 140 is tilted, the deviation in the optical axis of the light beam to the photodetector is kept low and the error of the output signal of the photodetector is kept small.

Note that when there is no inclination of the prism 140 and the optical axis of the light beam striking the prism 140 changes by exactly an angle θi, the optical axis of the light beam emitted from the first surface 133a of the third prism 133 changes by exactly 0.48 θi.

Further, the light beam from the direction of the emitted light beam is reflected by the film 134 and is emitted from the third surface 133c of the third prism 133, the optical axis of this emitted light beam changes by exactly 0.48 θi.

The smaller the beam magnification β, the smaller the deviation of the optical axis of the light beam emitted from the third surface 133c of the third prism 133.

For example, in the case of a beam magnification β of 1, in the case of a prism of a so-called usual "combined mirror" type, when the prism is tilted, the change of the optical axis of the light beam emitted from the third surface 133c of the third prism 133 is 0 or substantially 0.

Second Embodiment

Figure 12:
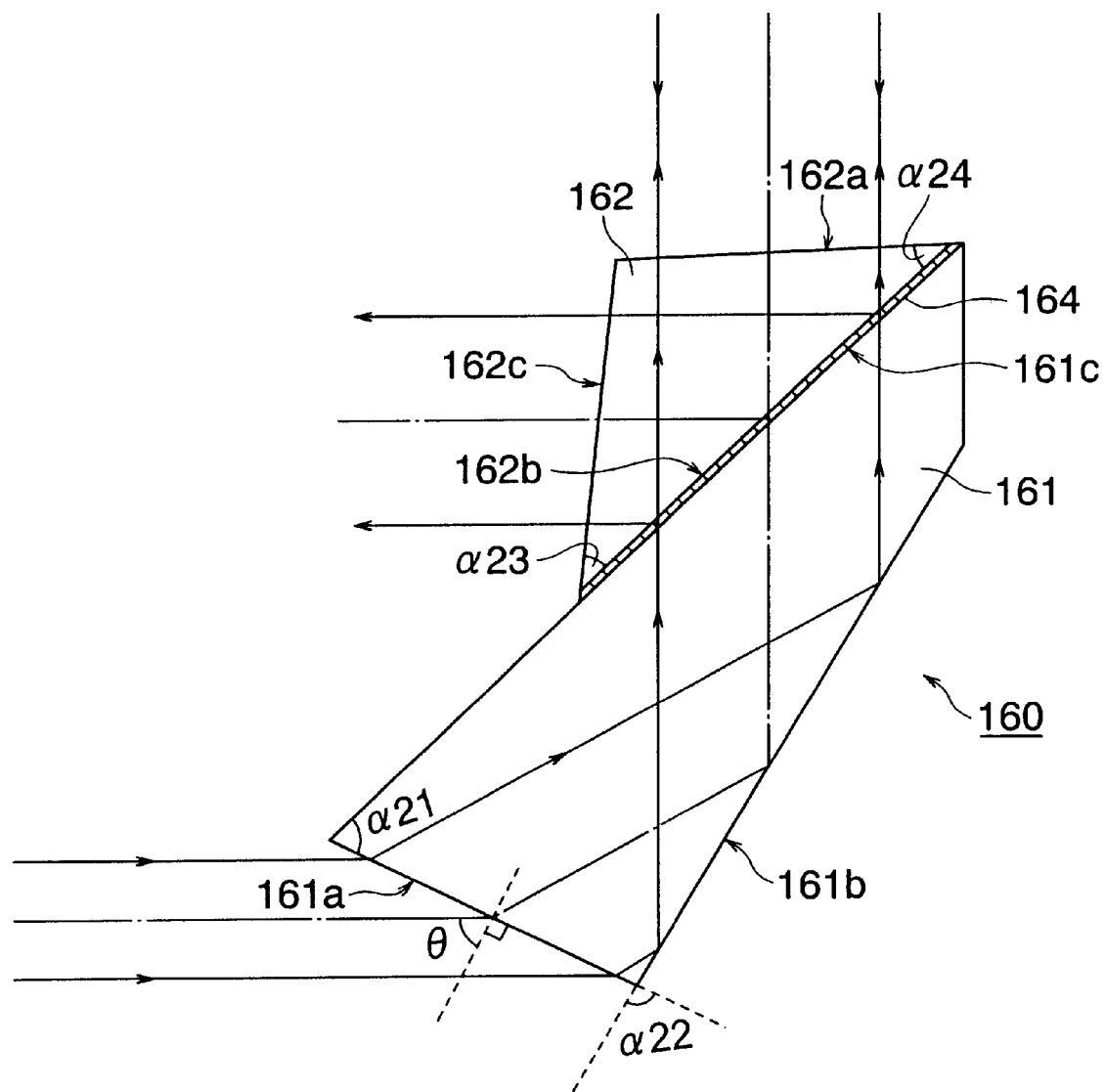
FIG. 12 is a schematic view of the configuration of a second embodiment of an optical element according to the present invention.

FIG. 12 is a schematic view of the configuration of a second embodiment of an optical element according to the present invention.

This prism 160 includes a first prism 161 having a first refractive index, a second prism 162 having a second refractive index, and a film 164.

The first prism 161 comprises a first surface 161a, a second surface 161b, and a third surface 161c.

The second prism 162 comprises a first surface 162a, a second surface 162b, and a third surface 162c.

The third surface 161c of the first prism 161 is joined with the second surface 162b of the second prism 162 with the film 164 in between. The film 164 may be for example a polarization film or a translucent film.

The prism 160 is struck by and shapes an incident light beam from the first surface 161a of the first prism 161, reflects the light beam refracted at the first surface 161a of the first prism 161 at the second surface 161b of the first prism 161, refracts the light beam reflected at the second surface 161b of the first prism 161 at the joined surfaces of the first prism 161 and the second prism 162 for achromatic correction, and refracts the light beam refracted at the joined surfaces at the first surface 162a of the second prism 162 to form an emitted light beam. In this way, the prism 160 has functions of beam shaping and achromatic correction.

The first prism 161 and the second prism 162 are formed so that the direction of the incident light beam and the direction of the emitted light beam perpendicularly or substantially perpendicularly interset in the same plane.

The prism 160 is struck by the light beam from the direction of the above light beam emitted from the first surface 162a of the second prism 162, reflects the light beam refracted at the first surface 162a of the second prism 162 at the film 164, refracts the light beam reflected at the film 164 at the third surface 162c of the second prism 162, and emits it in a direction parallel to or a direction substantially parallel to the direction of the incident light beam and in a direction opposite to or a direction substantially opposite to the direction of the incident light beam.

In this way, the prism 160 has the function of beam splitting. In addition, by provision of the reflecting surface 161b in the forward path, if the prism 160 tilts, the change of the optical axis of the light beam emitted from the third surface of the prism 160 is kept small.

Further, the angles θ and α21 to α24 are set so as to obtain the above characteristics of the prism 160.

In the prism 160, the plane defined by the direction of the incident light beam and the direction of the emitted light beam perpendicularly or substantially perpendicularly intersects the first surface 161a, the second surface 161b, and the third surface 161c of the first prism 161 and the first surface 162a, the second surface 162b, and the third surface 162c of the second prism 162.

As an example, the incident light beam is comprised of a laser beam from a semiconductor laser, and the beam magnification in the plane defined by the direction of the incident light beam and the direction of the emitted light beam is approximately 1.5 to approximately 2.2.

Preferably, the semiconductor laser generates the first incident light beam, and the beam magnification in the plane defined by the direction of the incident light beam and the direction of the emitted light beam is approximately 1.0 to approximately 2.1.

Figure 13:
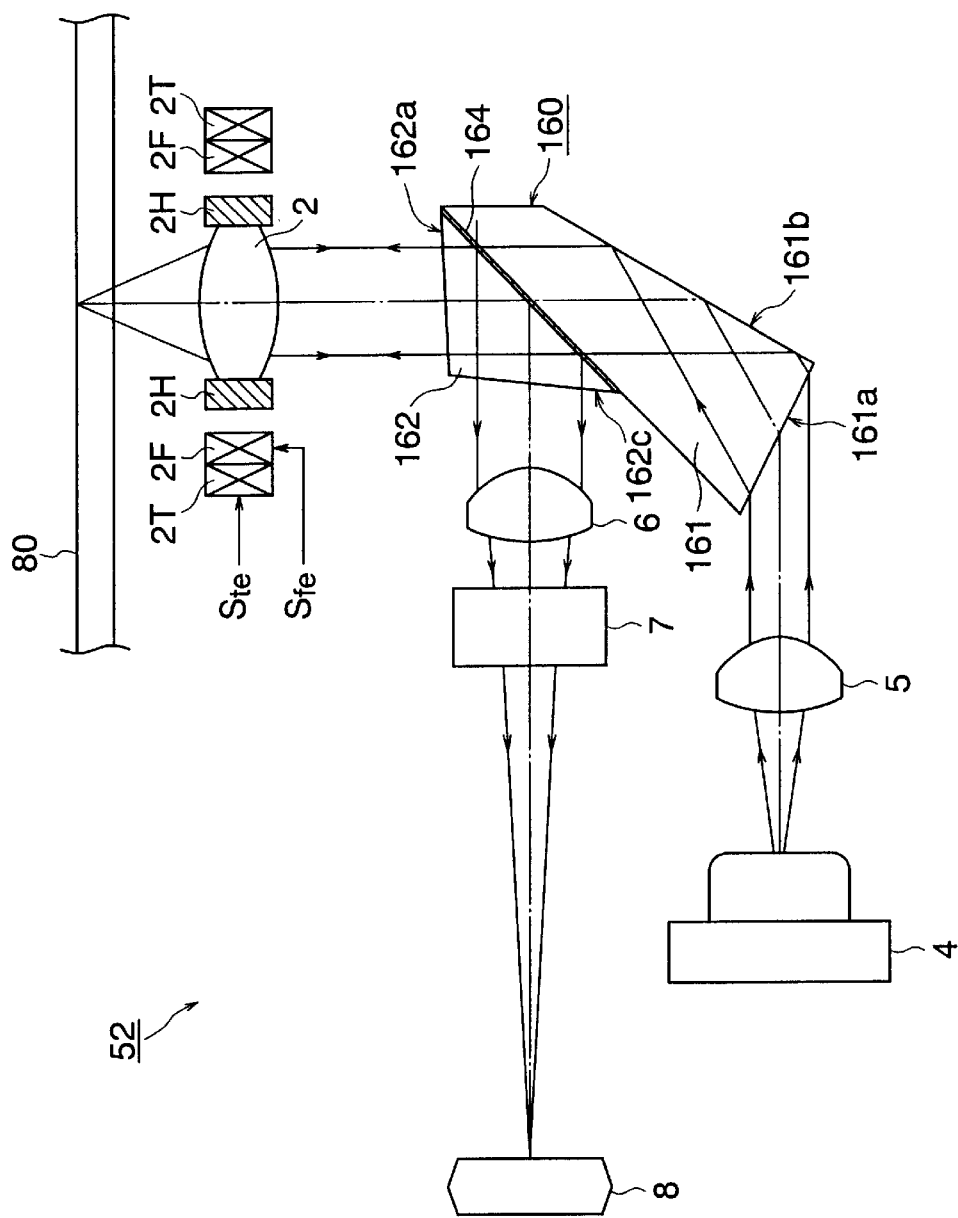
FIG. 13 is a schematic view of the configuration of an optical pick-up including the prism in FIG. 12.

FIG. 13 is a schematic view of the configuration of an optical pick-up including the prism 160 of FIG. 12. Note that the same reference numerals are assigned to the same components as in the optical pick-up 51 of FIG. 3, and explanations of these same components are suitably omitted.

The optical pick-up 52 comprises a semiconductor laser 4, a collimator lens 5, an optical element, that is, a beam shaping prism 160, an objective lens 2, a condenser lens 6, a cylindrical lens 7, a photodetector 8, a focusing actuator 2F, a tracking actuator 2T, and a lens holder 2H.

The semiconductor laser 4 emits a linearly polarized laser beam to the collimator lens 5.

The collimator lens 5 collimates the laser beam from the semiconductor laser 4 to make it a parallel beam and emits it to the beam shaping prism 160.

The beam shaping prism 160 shapes the laser beam from the collimator lens 5 and emits it to the objective lens 2.

The objective lens 2 converges the laser beam from the beam shaping prism 160 and directs it to an optical disk 80 to form a beam spot on the recording surface of the optical disk 80.

In addition, the objective lens 2 returns the laser beam reflected at the optical disk 80 (reflected laser beam) to the beam shaping prism 160.

The beam shaping prism 160 is struck by the laser beam from the objective lens 2, reflects it by a film 164, and emits it to the condenser lens 6.

The condenser lens 6 converges the light beam from the shaping prism 160 and emits it to the cylindrical lens 7.

The cylindrical lens 7 passes the light beam from the condenser lens 6 and emits it to the photodetector 8.

The photodetector 8 receives the laser beam from the beam shaping prism 160 at the receiving unit and generates an output signal.

The laser beam of the semiconductor laser 4 has a spread angle in the vertical direction different from that in the horizontal direction, so the sectional shape of the output laser beam is elliptical or near elliptical.

The beam shaping prism 160 changes the sectional shape of the laser beam from the semiconductor laser 4 from an ellipse to a circle at the incidence surface 161a to make the diameter of the beam in the long axis direction and short axis direction equal or substantially equal. In this way, the beam shaping prism 160 spreads the input light beam in one direction.

Further, the beam shaping prism 160 has the function of beam splitting. It reflects the light beam passed through the incidence surface 161a at the reflecting surface 161b, passes it through the film 164 and the incidence-emission surface 162a, and emits it to the objective lens 2. Further, the light beam reflected at the optical disk 80 is emits from the objective lens 2. It reflects this emits light beam at the film 164 and emits it to the photodetector 8.

The beam shaping prism 160 includes a first prism 161 having a first refractive index and a second prism 162 having a second refractive index. Since the beam shaping prism 160 comprises the first prism 161 and the second prism 162 joined together, even if the wavelength λ of the light beam output from the semiconductor laser 4 varies, a change of the optical axis due to this wavelength variation is suppressed, that is, there is an achromatic correction function.

Further, the beam shaping prism 160, by provision of the reflecting surface 161b in the forward path, keeps small the change of the optical axis of the light beam emitted from the third surface 162c and keeps small the positional deviation of the beam at the receiving surface of the photodetector 8 when the prism 160 is tilted.

Furthermore, making the optical axis of the light beam emitted from the third surface 162c of the second prism 162 opposite in direction to the direction of the incident light beam, it is possible to arrange the semiconductor laser 4 and collimator 5 and the photodetector 8 and condenser lens 6 aligned in the direction of the disk rotation axis and possible to make the optical pick-up 52 smaller.

Third Embodiment

Figure 14:
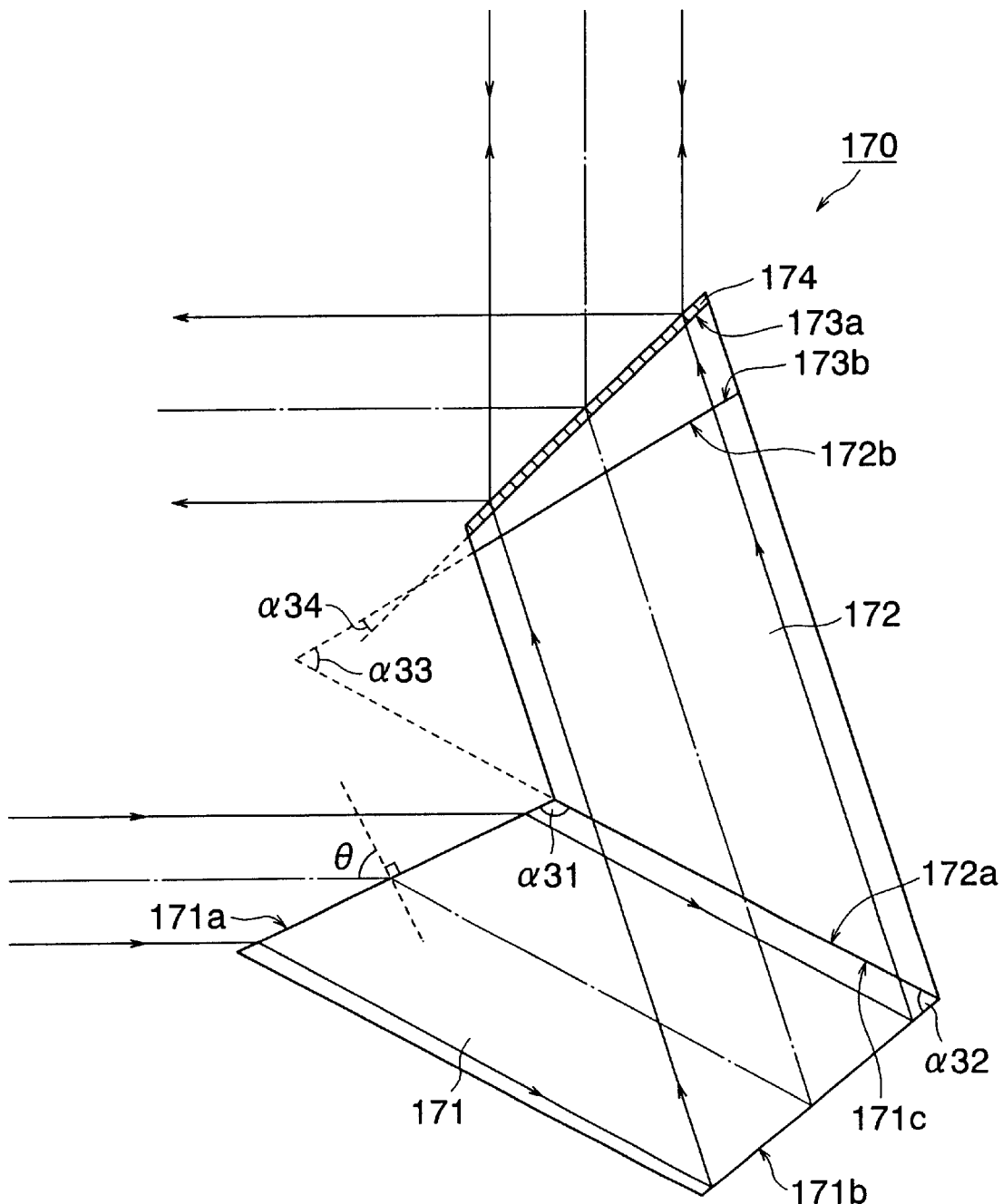
FIG. 14 is a schematic view of the configuration showing a third embodiment of an optical element according to the present invention.

FIG. 14 is a schematic view of the configuration of a third embodiment of an optical element according to the present invention.

This prism 170 includes a first prism 171 and a second prism 172 having a first refractive index, a third prism 173 having a second refractive index, and a film 174.

The first prism 171 comprises a first surface 171a, a second surface 171b, and a third surface 171c.

The second prism 172 comprises a first surface 172a and a second surface 172b.

The third prism 173 comprises a first surface 173a provided with a film 174 and a second surface 173b.

The third surface 171c of the first prism 171 is joined with the first surface 172a of the second prism 172.

The second surface 173b of the third prism 173 is joined with the second surface 172b of the second prism 172.

The film 174 may be a polarization film or a translucent film.

The prism 170 is struck by and shapes an incident light beam from the first surface 171a of the first prism 171, reflects the light beam refracted at the first surface 171a of the first prism 171 at the second surface 171b of the first prism 171, passes the light beam reflected at the second surface 171b of the first prism 171 through the first joined surfaces of the first prism 171 and the second prism 172, refracts the light beam passed through the first joined surfaces at the second joined surfaces where the second prism 172 and the third prism 173 are joined for achromatic correction, and passes the light beam refracted at the second joined surfaces through the first surface 173a of the third prism 173 and the film 174 to form an emitted light beam.

In this way, the prism 170 has the functions of beam shaping and achromatic correction.

The first prism 171, the second prism 172, and the third prism 173 are formed so that the direction of the incident light beam and the direction of the emitted light beam perpendicularly or substantially perpendicularly intersect in the same plane.

The film 174 reflects the light beam from the direction of the above emitted light beam to a direction parallel to or a direction substantially parallel to the direction of the incident light beam and in a direction opposite to or a direction substantially opposite to the direction of the incident light beam.

In this way, the prism 170 has the function of beam splitting. Further, by providing the reflecting surface 171b in the forward path, if the prism 170 tilts, it is possible to keep small the change of the optical axis of the light beam reflected at the film 174.

Further, the angles θ and α31 to α34 are set so as to obtain the above characteristics of the prism 170.

Further, in the prism 170, by adjusting the length of the second prism 172 in the forward path direction, it becomes possible to adjust the distance between the optical axis of the incident light beam and the optical axis of the light beam reflected at the film 174.

The plane defined by the direction of the incident light beam and the direction of the emitted light beam perpendicularly or substantially perpendicularly intersects the first surface 171a, the second surface 171b, and the third surface 171c of the first prism 171, the first surface 172a and the second surface 172b of the second prism 172, and the first surface 173a and the second surface 173b of the third prism 173.

For example, the incident light beam is comprised of a laser beam from a semiconductor laser, and the beam magnification in the plane defined by the direction of the incident light beam and the direction of the emitted light beam is approximately 1.5 to approximately 2.2.

Preferably, the semiconductor laser generates the first incident light beam, and the beam magnification in the plane defined by the direction of the incident light beam and the direction of the emitted light beam is approximately 1.9 to approximately 2.1.

Figure 15:
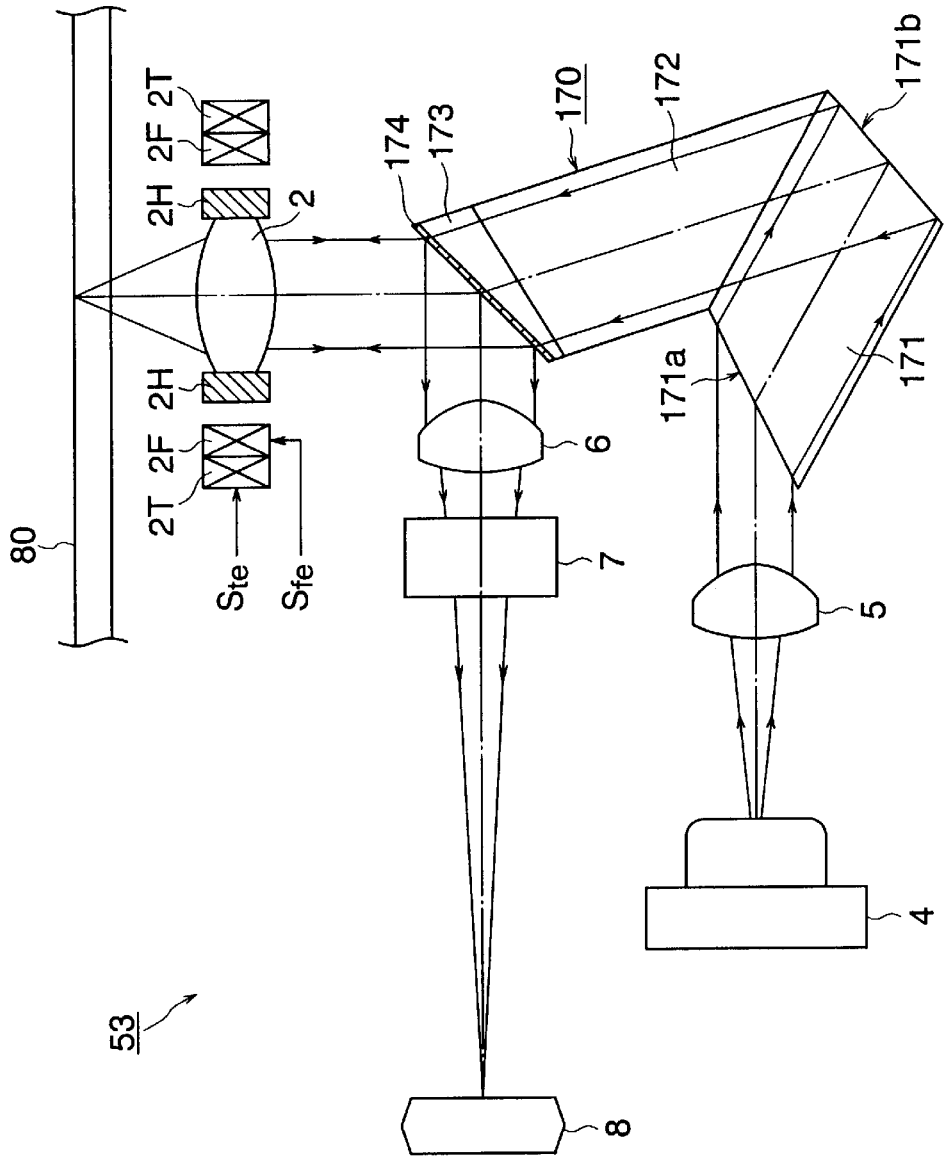
FIG. 15 is a schematic view of the configuration of an optical pick-up including the prism of FIG. 14.

FIG. 15 is a schematic view of the configuration of an optical pick-up including the prism 170 of FIG. 14. Note that the same reference numerals are assigned to components the same as in the optical pick-up of FIG. 3, and explanations of these same components are suitably omitted.

The optical pick-up 53 comprises a semiconductor laser 4, a collimator lens 5, an optical element, that is, a beam shaping prism 170, an objective lens 2, a condenser lens 6, a cylindrical lens 7, a photodetector 8, a focusing actuator 2F, a tracking actuator 2T, and a lens holder 2H.

The semiconductor laser 4 outputs a linearly polarized laser beam to the collimator lens 5.

The collimator lens 5 collimates the laser beam from the semiconductor laser 4 to make it a parallel beam and emits it to the beam shaping prism 170.

The beam shaping prism 170 shapes the laser beam from the collimator lens 5 and emits it to the objective lens 2.

The objective lens 2 converges the laser beam from the beam shaping prism 170 and emits it to an optical disk 80 to form a beam spot on the recording surface of the optical disk 80.

Further, the objective lens 2 returns the laser beam reflected from the optical disk 80 (reflected laser beam) to the beam shaping prism 170.

The beam shaping prism 170 is struck by the laser beam from the objective lens 2, reflects the incident light beam at a film 174, and emits it to the condenser lens 6.

The condenser lens 6 converges the light beam from the beam shaping prism 170 and emits it to the cylindrical lens 7.

The cylindrical lens 7 passes the light beam from the condenser lens 6 and emits it to the photodetector 8.

The photodetector 8 receives the laser beam from the beam shaping prism 170 at the receiving unit and generates an output signal.

The laser beam from the semiconductor laser 4 has a spread angle in the vertical direction different from that in the horizontal direction, so the sectional shape of the output laser beam is elliptical or near elliptical.

The beam shaping prism 170 changes the sectional shape of the laser beam output from the semiconductor laser 4 from an ellipse to a circle at an incidence surface 171a to make the diameter of the beam in the long axis direction and short axis direction equal or substantially equal. In this way, the beam shaping prism 170 spreads the input light beam in one direction.

Further, the beam shaping prism 170 also has the function of beam splitting. It reflects a light beam passed through the incidence surface 171a at the reflecting surface 171b, passes it through the second prism 172, the third prism 173, and the film 174, and emits it to the objective lens 2. At the same time, the light beam reflected at the optical disk 80 is from the objective lens 2. The prism reflects this light beam at the film 174 and emits it to the photodetector 8.

The beam shaping prism 170 includes a first prism 171 having a first refractive index and a second prism 172 having a second refractive index. Since the beam shaping prism 170 comprises the second prism 172 and the third prism 173 joined together, even if the wavelength λ of the light beam from the semiconductor laser 4 varies, a change of the optical axis due to this wavelength variation is suppressed, i.e., there is a so-called achromatic correction function.

Further, the beam shaping prism 170, by provision of the reflecting surface 171b in the forward path, keeps small the change of the optical axis of the light beam reflected at the film 174 and keeps small the positional deviation of the beam on the receiving surface of the photodetector 8 when the prism 170 tilts.

Further, by making the optical axis of the light beam reflected at the film 174 opposite in direction from the direction of the incident light beam, it is possible to arrange the semiconductor laser 4 and collimator 5 and the photodetector 8 and condenser lens 6 aligned along the direction of the disk rotation axis and possible to make the optical pick-up 53 smaller.

Fourth Embodiment

Figure 16:
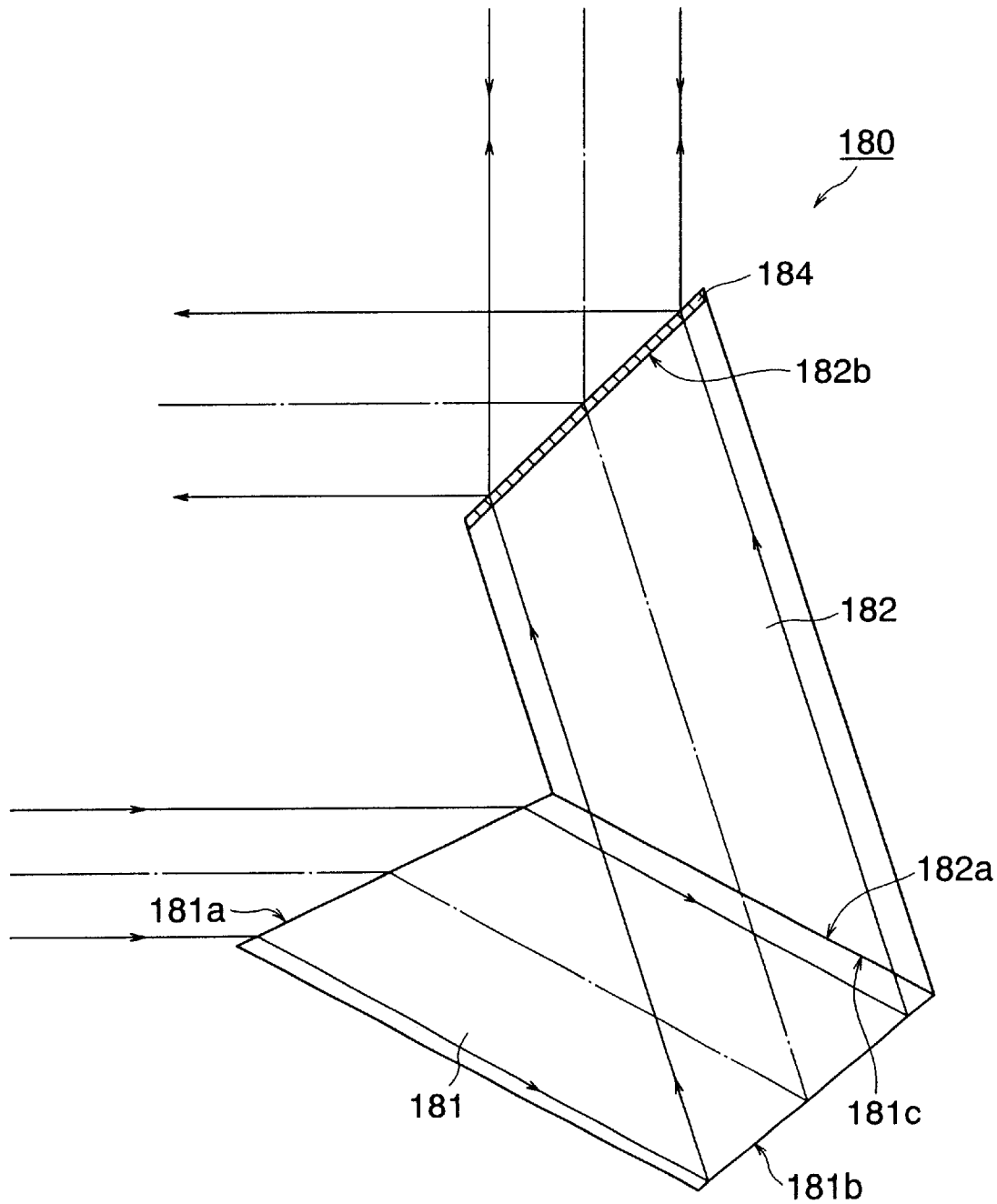
FIG. 16 is a schematic view of the configuration of a fourth embodiment of an optical element according to the present invention.

FIG. 16 is a schematic view of the configuration of a fourth embodiment of an optical element according to the present invention. The prism 180 is a modification of the prism 170 of FIG. 14 and the prism 140 of FIG. 7.

This prism 180 includes a first prism 181 having a first refractive index, a second prism 182 having a second refractive index, and a film 184.

The first prism 181 comprises a first surface 181a, a second surface 181b, and a third surface 181c.

The second prism 182 comprises a first surface 182a and a second surface 182b provided with a film 184.

The third surface 181c of the first prism 181 is joined with the first surface 182a of the second prism 182.

The film 184 may be a polarization film or a translucent film.

The prism 180 is struck by and shapes an incident light beam from the first surface 181a of the first prism 181, reflects the light beam refracted at the first surface 181a of the first prism 181 at the second surface 181b of the first prism 181, refracts the light beam reflected at the second surface 181b of the first prism 181 at the joined surfaces of the first prism 181e and the second prism 182 for achromatic correction, and passes the light beam refracted at the joined surfaces through the second surface 182b and the film 184 of the second prism 182 to form an emitted light beam.

The first prism 181 and the second prism 182 are formed so that the direction of the incident light beam and the direction of the emitted light beam perpendicularly or substantially perpendicularly intersect in the same plane.

The film 184 reflects the light beam from the direction of the above emitted light beam to a direction parallel to or a direction substantially parallel to the direction of the incident light beam and in a direction opposite to or a direction substantially opposite to the direction of the incident light beam.

The plane defined by the direction of the incident light beam and the direction of the emitted light beam perpendicularly or substantially perpendicularly intersects the first surface 181a, the second surface 181b, and the third surface 181c of the first prism 181 and the first surface 182a and the second surface 182b of the second prism 182.

For example, the incident light beam is comprised of a laser beam from a semiconductor laser, and the beam magnification in the plane defined by the direction of the incident light beam and the direction of the emitted light beam is approximately 1.5 to approximately 2.2.

Preferably, the semiconductor laser generates the first incident light beam, and the beam magnification in the plane defined by the direction of the incident light beam and the direction of the emitted light beam is approximately 1.9 to approximately 2.1.

Figure 17:
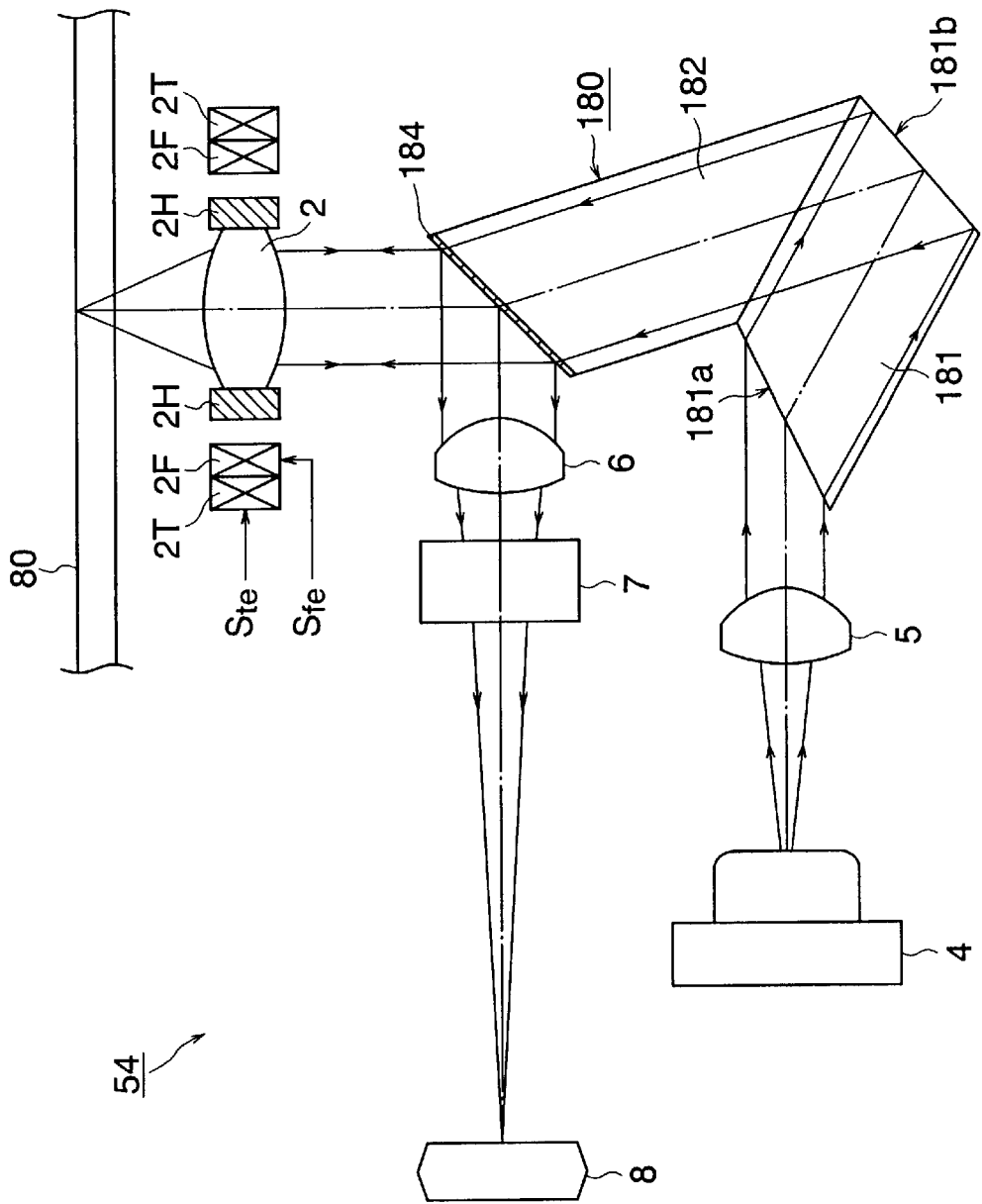
FIG. 17 is a schematic view of an optical pick-up including the prism in FIG. 16.

FIG. 17 is a schematic view of the configuration of an optical pick-up including the prism 180 as shown of FIG. 16. Note that the same reference numerals are assigned to components the same as in the optical pick-up of FIG. 3, and explanations of these same components are suitably omitted.

The optical pick-up 54 comprises a semiconductor laser 4, a collimator lens 5, an optical element, that is, a beam shaping prism 180, an objective lens 2, a condenser lens 6, a cylindrical lens 7, a photodetector 8, a focusing actuator 2F, a tracking actuator 2T, and a lens holder 2H.

The semiconductor laser 4 emits a linearly polarized laser beam to the collimator lens 5.

The collimator lens 5 collimates the laser beam from the semiconductor laser 4 to make it a parallel beam and emits it to the beam shaping prism 180.

The beam shaping prism 180 shapes the laser beam from the collimator lens 5 and emits it to the objective lens 2.

The objective lens 2 converges the laser beam from the beam shaping prism 180 and emits it to an optical disk 80 to form a beam spot on the recording surface of the optical disk 80.

Further, the objective lens 2 returns the light beam comprised of the laser beam reflected at the optical disk 80 (reflected laser beam) to the beam shaping prism 110.

The beam shaping prism 180 is struck by the light beam from the objective lens 2, reflects the incident light beam at a film 184, and emits it to the condenser lens 6.

The condenser lens 6 converges the light beam from the beam shaping prism 180 and emits it to the cylindrical lens 7.

The cylindrical lens 7 passes the light beam coming from the condenser lens 6 and emits it to the photodetector 8.

The photodetector 8 receives the laser beam from the beam shaping prism 180 at the receiving unit and generates an output signal.

The laser beam from the semiconductor laser 4 has a spread angle in the vertical direction different from that in the horizontal direction, so the sectional shape of the output laser beam is elliptical or near elliptical.

The beam shaping prism 180 changes the sectional shape of the laser beam from the semiconductor laser 4 from an ellipse to a circle at the incidence surface 181a to make the diameter of the beam in the long axis direction and short axis direction equal or substantially equal. In this way, the beam shaping prism 180 spreads the input light beam in one direction.

Further, the beam shaping prism 180 has the function of beam splitting. It reflects a light beam passed through the incidence surface 181a at the reflecting surface 181b, passes it through the second prism 182 and the film 184, and emits it to the objective lens 2. At the same time, the light beam reflected at the optical disk 80 is from the objective lens 2. The prism reflects this light beam at the film 184 and emits it to the photodetector 8.

The beam shaping prism 180 includes a first prism 181 having a first refractive index and a second prism 182 having a second refractive index. Since the beam shaping prism 180 comprises the first prism 181 and the second prism 182 joined together, even if the wavelength λ of the light beam emitted from the semiconductor laser 4 varies, a change of the optical axis due to this wavelength variation is suppressed, and there is a so-called achromatic correction function.

Further, the beam shaping prism 180, by provision of the reflecting surface 181b in the forward path, keeps small the change of the optical axis of the light beam reflected at the film 184 and keeps small the positional deviation of the beam on the receiving surface of the photodetector 8 when the prism 180 tilts.

Furthermore, by making the optical axis of the light beam reflected at the film 184 opposite in direction to the direction of the incident light beam, it is possible to arrange the semiconductor laser 4 and collimator 5 and the photodetector 8 and condenser lens 6 aligned in the direction of the disk rotation axis and possible to make the optical pick-up 54 smaller.

Note that the above embodiments are examples of the present invention. The present invention is not limited to the above embodiments.

According to the present invention, there is provided an optical pick-up capable of keeping small the change of the optical axis of the light beam emitted to the photodetector and an optical element capable of being used in the optical pick-up.

In addition, in the optical pick-up according to the present invention, because the optical element reflects the light beam from the emitted light beam to a direction opposite to the direction of the incident light beam, the laser and photodetector can be arranged on the same side of the optical element and therefore the optical pick-up can be made smaller compared with the case of aligning the laser and photodetector on different sides of the optical element.

Note that the present invention is not limited to the above embodiments and includes modifications within the scope of the claims.

What is claimed is:

1. An optical element comprising:

a first prism having a first refractive index and including a first incidence surface, a first emission surface forming a first angle with the first incidence surface, and a first reflection surface facing the first incidence surface and forming a second angle with the first emission surface;

a second prism having a second refractive index and including a second incidence surface in contact with the first emission surface, and a second emission surface facing the second incidence surface;

a third prism having the second refractive index and including a third incidence surface in contact with the second emission surface, a first incidence-emission surface forming a fourth angle with the third incidence surface, and a third emission surface forming a fifth angle with the third incidence surface;

a film between the second emission surface and the third incidence surface and cooperating with the second emission surface and the third incidence surface to emit the light beam striking the third incidence surface from the second emission surface as a first emitted light beam through the first incidence-emission surface, and to emit a second incident light beam striking the third incidence surface from the first incidence-emission surface as a second emitted light beam through the third emission surface; and wherein the first prism shapes a first incident light beam with a wavelength striking the first incidence surface at an incident angle, and makes the light beam reflected at the first reflection surface parallel to the optical axis of the second prism and strike the second incidence surface, and wherein the first emission surface and the second incidence surface are defined so as to cancel a change of an optical axis caused by a variation of the wavelength of the light beam.

2. An optical element as set forth in claim 1, wherein said first incident light beam and said first emitted light beam are in the same plane.

3. An optical element as set forth in claim 2, wherein the plane defined by the direction of said first incident light beam and the direction of said first emitted light beam substantially perpendicularly intersects said first incidence surface, said first reflection surface, and said first emission surface of said first prism, said second incidence surface and said second emission surface of said second prism, and said third incidence surface, said first incidence-emission surface, and said third emission surface of said third prism.

4. An optical element as set forth in claim 3, wherein said incidence angle; said first and second refractive indexes; said first angle formed by said first incidence surface and said first emission surface; said second angle formed by said first reflection surface and said first emission surface; and said fourth angle formed by said third incidence surface and said first emission surface, are defined so that the direction of said first incident light beam is substantially opposite and parallel to the direction of said second emitted light beam; and the direction of said first incident light beam is substantially perpendicular with the direction of said first emitted light beam.

5. An optical element as set forth in claim 4, wherein the beam magnification in the plane defined by the direction of the first incident light beam and the direction of said first emitted light beam is approximately 1.5 to approximately 2.2.

6. An optical element as set forth in claim 5, wherein said second prism comprises a triangular prism of which said second incidence surface directly intersects with said second emission surface.

7. An optical element as set forth in claim 5, wherein said second prism comprises a quadrilateral prism of which said second incidence surface and said second emission surface are apart from each other.

8. An optical element as set forth in claim 5, wherein said film comprises a translucent film or a polarization film.

9. An optical pick-up comprising an optical element, a light source for generating a light beam to strike the optical element, an objective lens for converging the light beam emitted from the optical element, and a photodetector for detecting the emitted light beam from the optical element, wherein the optical element comprises:

a first prism having a first refractive index and including a first incidence surface, a first emission surface forming a first angle with the first incidence surface, and a first reflection surface facing the first incidence surface and forming a second angle with the first emission surface;

a second prism having a second refractive index and including a second incidence surface in contact with the first emission surface, and a second emission surface facing the second incidence surface;

a third prism having the second refractive index and including a third incidence surface in contact with the second emission surface, a first incidence-emission surface forming a fourth angle with the third incidence surface, and a third emission surface forming a fifth angle with the third incidence surface;

a film between the second emission surface and the third incidence surface and cooperating with the second emission surface and the third incidence surface to emit the light beam striking the third incidence surface from the second emission surface as a first emitted light beam through the first incidence-emission surface, and to emit a second incident light beam striking the third incidence surface from the first incidence-emission surface as a second emitted light beam through the third emission surface;

wherein the first prism shapes a first incident light beam with a wavelength striking the first incidence surface at an incident angle, and makes the light beam reflected at the first reflection surface parallel to the optical axis of the second prism and strike the second incidence surface;

the first emission surface and the second incidence surface are defined so as to cancel a change of an optical axis caused by a variation of the wavelength of the light beam, and wherein the optical element is formed so that the first incident light beam and the first emitted light beam are in the same plane; the plane defined by the direction of said first incident light beam and the direction of said first emitted light beam substantially perpendicularly intersects the first incidence surface, the first reflection surface, and the first emission surface of the first prism, the second incidence surface and the second emission surface of the second prism, and the third incidence surface, the first incidence-emission surface, and the third emission surface of the third prism; the direction of the first incident light beam is substantially opposite and parallel to the direction of the second emitted light beam; and the direction of the first incident light beam is substantially perpendicular with the direction of the first emitted light beam; and wherein the light source is positioned in front of the first incidence surface of the first prism, the objective lens is positioned in front of the first incidence-emission surface of the third prism, and the photodetector is positioned in front of the third emission surface of the third prism.

10. An optical pick-up as set forth in claim 9, wherein:

said light source comprises a semiconductor laser that generates said first incident light beam;

the beam magnification in the plane defined by the direction of the first incident light beam and the direction of said first emitted light beam is approximately 1.9 to approximately 2.1; and said first prism shapes the first incident light beam with a wavelength striking said first incidence surface at an incident angle substantially into a circular light beam.

11. An optical pick-up as set forth in claim 9, wherein said film comprises a translucent film or a polarization film.

12. An optical element comprising:

a first prism having a first refractive index and including a first incidence surface, a first emission surface forming a first angle with the first incidence surface, and a first reflection surface forming a second angle with the first incidence surface;

a second prism having a second refractive index and including a second incidence surface in contact with the first emission surface, and a second emission surface forming a fourth angle with the second incidence surface;

a film between the first emission surface and the second incidence surface and cooperating with the first emission surface and the second incidence surface to emit the light beam striking the second incidence surface from the first emission surface as a first emitted light beam through the first incidence-emission surface, and to emit a second incident light beam striking the second incidence surface from the first incidence-emission surface as a second emitted light beam through the second emission surface, and wherein the first prism shapes a first incident light beam with a wavelength striking the first incidence surface at an incident angle, and makes the light beam reflected at the first reflection surface parallel to the optical axis of the second prism and strike the second incidence surface, and the first emission surface and the second incidence surface are defined so as to cancel a change of an optical axis caused by a variation of the wavelength of the light beam.

13. An optical element as set forth in claim 12 wherein said first incident light beam and said first emitted light beam are in the same plane.

14. An optical element as set forth in claim 13 wherein the plane defined by the direction of said first incident light beam and the direction of said first emitted light beam substantially perpendicularly intersects said first incidence surface, said first reflection surface, and said first emission surface of said first prism, and said second incidence surface, said first incidence-emission surface, and said second emission surface of said second prism.

15. An optical element as set forth in claim 14, wherein said incidence angle of said first incident light beam; said first and second refractive indexes; said first angle formed by said first incidence surface and said first emission surface; said second angle formed by said first reflection surface and said first incidence surface; said third angle formed by said second incidence surface and said second emission surface; and said fourth angle formed by said second incidence surface and said first incidence-emission surface, are defined so that the direction of said first incident light beam is substantially opposite and parallel to the direction of said second emitted light beam; and the direction of said first incident light beam is substantially perpendicular with the direction of said first emitted light beam.

16. An optical element as set forth in claim 15, wherein the beam magnification in the plane defined by the direction of the first incident light beam and the direction of said first emitted light beam is approximately 1.5 to approximately 2.2.

17. An optical element as set forth in claim 16, wherein said film comprises a translucent film or a polarization film.

18. An optical pick-up comprising:

an optical element;

a light source for generating a light beam to strike the optical element;

an objective lens for converging the light beam emitted from the optical element; and a photodetector for detecting the emitted light beam from the optical element, wherein the optical element comprises a first prism having a first refractive index and including a first incidence surface, a first emission surface forming a first angle with the first incidence surface, and a first reflection surface forming a second angle with the first incidence surface;

a second prism having a second refractive index and including a second incidence surface in contact with the first emission surface, and a second emission surface forming a fourth angle with the second incidence surface;

a film between the first emission surface and the second incidence surface and cooperating with the first emission surface and the second incidence surface to emit the light beam striking the second incidence surface from the first emission surface as a first emitted light beam through the first incidence-emission surface, and to emit a second incident light beam striking the second incidence surface from the first incidence-emission surface as a second emitted light beam through the second emission surface;

wherein the first prism shapes a first incident light beam with a wavelength striking the first incidence surface at an incident angle, and makes the light beam reflected at the first reflection surface parallel to the optical axis of the second prism and strike the second incidence surface;

the first emission surface and the second incidence surface are defined so as to cancel a change of an optical axis caused by a variation of the wavelength of the light beam, and wherein the optical element is formed so that the first incident light beam and the first emitted light beam are in the same plane; the plane defined by the direction of the first incident light beam and the direction of the first emitted light beam substantially perpendicularly intersects the first incidence surface, the first reflection surface, and the first emission surface of the first prism, and the second incidence surface, the second incidence-emission surface, and the second emission surface of the second prism; and the direction of the first incident light beam is substantially opposite and parallel to the direction of said second emitted light beam, and the direction of the first incident light beam is substantially perpendicular with the direction of the first emitted light beam; and wherein the light source is positioned in front of the first incidence surface of the first prism, the objective lens is positioned in front of the first incidence-emission surface of the second prism, and the photodetector is positioned in front of the second emission surface of the second prism.

19. An optical pick-up as set forth in claim 18, wherein:

said light source is a semiconductor laser that generates said first incident light beam;

the beam magnification in the plane defined by the direction of the first incident light beam and the direction of said first emitted light beam is approximately 1.9 to approximately 2.1; and said first prism shapes the first incident light beam with a wavelength striking said first incidence surface at an incident angle substantially into a circular light beam.

20. An optical pick-up as set forth in claim 19, wherein said film comprises a translucent film or a polarization film.

21. An optical element comprising:

a first prism having a first refractive index and including a first incidence surface, a first emission surface forming a first angle with the first incidence surface, and a first reflection surface facing the first incidence surface and forming a second angle with the first emission surface;

a second prism having the first refractive index and including a second incidence surface in contact with the first emission surface, and a second emission surface facing the second incidence surface and forming a third angle with the second incidence surface, a third prism having a second refractive index and including a third incidence surface in contact with the second emission surface, a third emission surface facing the third incidence surface forming a fourth angle with the third incidence surface;

a film attached on the third emission surface of the third prism and cooperating with the third emission surface to emit the light beam striking the third incidence surface from the second emission surface as a first emitted light beam, and to reflect a second incident light beam striking the third emission surface and emit it as a second emitted light beam;

wherein the first prism shapes a first incident light beam with a wavelength striking the first incidence surface at an incident angle, and makes the light beam reflected at the first reflection surface parallel to the optical axis of the second prism and strike the second incidence surface, and the second emission surface and the third incidence surface are defined so as to cancel a change of an optical axis caused by a variation of the wavelength of the light beam.

22. An optical element as set forth in claim 21, wherein said first incident light beam and said first emitted light beam are in the same plane.

23. An optical element as set forth in claim 22, wherein the plane defined by the direction of said first incident light beam and the direction of said first emitted light beam substantially perpendicularly intersects said first incidence surface, said first reflection surface, and said first emission surface of said first prism, said second incidence surface and said second emission surface of said second prism, and said third incidence surface, and said third emission surface of said third prism.

24. An optical element as set forth in claim 23, wherein said incidence angle of said first incident light beam; said first and second refractive indexes; said first angle formed by said first incidence surface and said first emission surface; said second angle formed by said first reflection surface and said first emission surface; said third angle formed by said second incidence surface and said second emission surface; and said fourth angle formed by said third incidence surface and said third emission surface, are defined so that the direction of said first incident light beam is substantially opposite and parallel to the direction of said second emitted light beam; and the direction of said first incident light beam is substantially perpendicular with the direction of said first emitted light beam.

25. An optical element as set forth in claim 24, wherein the beam magnification in the plane defined by the direction of the first incident light beam and the direction of said first emitted light beam is approximately 1.5 to approximately 2.2.

26. An optical element as set forth in claim 25, wherein said film comprises a translucent film or a polarization film.

27. An optical pick-up comprising:

an optical element;

a light source for generating a light beam to strike the optical element;

an objective lens for converging the light beam emitted from the optical element; and a photodetector for detecting the emitted light beam from the optical element, wherein the optical element comprises:

a first prism having a first refractive index and including a first incidence surface, a first emission surface forming a first angle with the first incidence surface, and a first reflection surface facing the first incidence surface and forming a second angle with the first emission surface;

a second prism having the first refractive index and including a second incidence surface in contact with the first emission surface, and a second emission surface facing the second incidence surface and forming a third angle with the second incidence surface;

a third prism having a second refractive index and including a third incidence surface in contact with the second emission surface, a third emission surface facing the third incidence surface forming a fourth angle with the third incidence surface;

a film attached on the third emission surface of the third prism and cooperating with the third emission surface to emit the light beam striking the third incidence surface from the second emission surface as a first emitted light beam, and to reflect a second incident light beam striking the third emission surface and omit it as a second emitted light beam;

wherein the first prism shapes a first incident light beam with a wavelength striking the first incidence surface at an incident angle, and makes the light beam reflected at the first reflection surface parallel to the optical axis of the second prism and strike the second incidence surface, the second emission surface and the third incidence surface are defined so as to cancel a change of an optical axis caused by a variation of the wavelength of the light beam, and wherein the optical element is formed so that the first incident light beam and the first emitted light beam are in the same plane; the plane defined by the direction of said first incident light beam and the direction of said first emitted light beam substantially perpendicularly intersects said first incidence surface, said first reflection surface, and said first emission surface of said first prism, said second incidence surface and said second emission surface of said second prism, and said third incidence surface, and said third emission surface of said third prism; the direction of the first incident light beam is substantially opposite and parallel to the direction of said second emitted light beam; and the direction of said first incident light beam is substantially perpendicular with the direction of said first emitted light beam, and wherein the light source is positioned in front of the first incidence surface of the first prism;

the objective lens is positioned in front of the first incidence-emission surface of the third prism; and the photodetector is positioned in front of the third emission surface of the third prism.

28. An optical pick-up as set forth in claim 27, wherein said light source is a semiconductor laser that generates said first incident light beam, the beam magnification in the plane defined by the direction of the first incident light beam and the direction of said first emitted light beam is approximately 1.9 to approximately 2.1, and said first prism shapes the first incident light beam with a wavelength striking said first incidence surface at an incident angle substantially into a circular light beam.

29. An optical pick-up as set forth in claim 28, wherein said film comprises a translucent film or a polarization film.

30. An optical element comprising:

a first prism having a first refractive index and including a first incidence surface, a first emission surface forming a first angle with the first incidence surface, and a first reflection surface facing the first incidence surface and forming a second angle with the first emission surface, a second prism having the first refractive index and including a second incidence surface in contact with the first emission surface, and a second emission surface facing the second incidence surface and forming a third angle with the second incidence surface, a film attached on the second emission surface of the second prism and cooperating with the second emission surface of the second prism to emit the light beam striking the second emission surface from the first emission surface an a first emitted light beam, and to reflect a second incident light beam striking the second emission surface and emit it as a second emitted light beam; and wherein the first prism shapes a first incident light beam with a wavelength striking said first incidence surface at an incident angle, and makes the light beam reflected at the first reflection surface parallel to the optical axis of the second prism and strike the second incidence surface, the first emission surface and the second incidence surface are defined so as to cancel a change of an optical axis caused by a variation of the wavelength of the light beam.

31. An optical element as set forth in claim 30, wherein said first incident light beam and said first emitted light beam are in the same plane.

32. An optical element as set forth in claim 31, wherein the plane defined by the direction of said first incident light beam and the direction of said first emitted light beam substantially perpendicularly intersects said first incidence surface, said first reflection surface, and said first emission surface of said first prism, and said second incidence surface and said second emission surface of said second prism.

33. An optical element as set forth in claim 32, wherein said incidence angle of said first incident light beam, said first and second refractive indexes; said first angle formed by said first incidence surface and said first emission surface; said second angle formed by said first reflection surface and said first emission surface; said third angle formed by said second incidence surface and said second emission surface, are defined so that the direction of said first incident light beam is substantially opposite and parallel to the direction of said second emitted light beam; and the direction of said first incident light beam is substantially perpendicular with the direction of said first emitted light beam.

34. An optical element as set forth in claim 33, wherein the beam magnification in the plane defined by the direction of the first incident light beam and the direction of said first emitted light beam is approximately 1.5 to approximately 2.2.

35. An optical element as set forth in claim 34, wherein said film comprises a translucent film or a polarization film.

36. An optical pick-up comprising:

an optical element;

a light source for generating a light beam to strike the optical element;

an objective lens for converging the light beam emitted from the optical element; and a photodetector for detecting the emitted light beam from the optical element, wherein the optical element comprises:

a first prism having a first refractive index and including a first incidence surface, a first emission surface forming a first angle with the first incidence surface, and a first reflection surface facing the first incidence surface and forming a second angle with the first emission surface;

a second prism having the first refractive index and including a second incidence surface in contact with the first emission surface, and a second emission surface facing the second incidence surface and forming a third angle with the second incidence surface; and a film attached on the second emission surface of the second prism and cooperating with the second emission surface to emit the light beam striking the second emission surface from the first emission surface as a first emitted light beam, and to reflect a second incident light beam striking the second emission surface and emit it as a second emitted light beam;

wherein the first prism shapes a first incident light beam with a wavelength striking the first incidence surface at an incident angle, and makes the light beam reflected at the first reflection surface parallel to the optical axis of the second prism and strike the second incidence surface, the first emission surface and the second incidence surface are defined so as to cancel a change of an optical axis caused by a variation of the wavelength of the light beam, and wherein the optical element is formed so that the first incident light beam and the first emitted light beam are in the same plane; the plane defined by the direction of the first incident light beam and the direction of the first emitted light beam substantially perpendicularly intersects the first incidence surface, the first reflection surface, and the first emission surface of the first prism, the second incidence surface and the second emission surface of the second prism; the direction of the first incident light beam is substantially opposite and parallel to the direction of the second emitted light beam; and the direction of the first incident light beam is substantially perpendicular with the direction of the first emitted light beam; and wherein the light source is positioned in front of the first incidence surface of the first prism;

the objective lens is positioned in front of the second emission surface of the second prism along the direction of the first emitted light beam; and the photodetector is positioned in front of the second emission surface of the second prism along the direction of the second emitted light beam.

37. An optical pick-up as set forth in claim 36, wherein:

said light source is a semiconductor laser that generates said first incident light beam;

the beam magnification in the plane defined by the direction of the first incident light beam and the direction of said first emitted light beam is approximately 1.9 to approximately 2.1; and said first prism shapes the first incident light beam with a wavelength striking said first incidence surface at an incident angle substantially into a circular light beam.

38. An optical pick-up as set forth in claim 37, wherein said film comprises a translucent film or a polarization film.

* * * * *

UNITED STATES PATENT AND TRADEMARK OFFICE
CERTIFICATE OF CORRECTION

PATENT NO. : 6,744,720 B2
DATED : June 1, 2004
INVENTOR(S) : Nobuhiko Ando

It is certified that error appears in the above-identified patent and that said Letters Patent is hereby corrected as shown below:

Column 17,
Line 6, change "1.56832" to -- 1.58832 --.
Line 44, change "omitted" to -- emitted --.

Column 19,
Line 30, change "1.0" to -- 1.9 --.

Column 20,
Line 35, change "Furthermore, making" to -- Furthermore, by making --.

Column 23,
Line 19, change "181e" to -- 181 --.

Column 24,
Line 7, change "110" to -- 180 --.

Signed and Sealed this

Second Day of November, 2004

JON W. DUDAS
*Director of the United States Patent and Trademark Office*